United States Patent
Crespi et al.

(10) Patent No.: US 11,109,310 B1
(45) Date of Patent: Aug. 31, 2021

(54) INFRASTRUCTURE-BASED ACCESS POINT LOAD BALANCING

(71) Applicant: Amazon Technologies, Inc., Seattle, WA (US)

(72) Inventors: Edgar Aaron Crespi, Mercer Island, WA (US); Sean P. Crandall, Sammamish, WA (US); Randall Darche, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 167 days.

(21) Appl. No.: 16/573,876

(22) Filed: Sep. 17, 2019

(51) Int. Cl.
| | |
|---|---|
| *H04W 48/20* | (2009.01) |
| *H04W 48/14* | (2009.01) |
| *H04W 76/11* | (2018.01) |
| *H04W 28/08* | (2009.01) |
| *H04W 12/06* | (2021.01) |
| *H04W 12/03* | (2021.01) |

(52) U.S. Cl.
CPC ............ *H04W 48/20* (2013.01); *H04W 12/03* (2021.01); *H04W 12/06* (2013.01); *H04W 28/08* (2013.01); *H04W 48/14* (2013.01); *H04W 76/11* (2018.02)

(58) Field of Classification Search
CPC ..... H04W 48/20; H04W 76/11; H04W 12/03; H04W 12/06; H04W 28/08; H04W 48/14
USPC ........................................................ 370/329
See application file for complete search history.

(56) References Cited

U.S. PATENT DOCUMENTS

| | | |
|---|---|---|
| 7,225,980 B2 | 6/2007 | Ku et al. |
| 7,949,568 B2 | 5/2011 | Fano et al. |
| 8,009,864 B2 | 8/2011 | Linaker et al. |
| 8,175,925 B1 | 5/2012 | Rouaix |
| 8,189,855 B2 | 5/2012 | Opalach et al. |
| 8,423,431 B1 | 4/2013 | Rouaix et al. |
| 8,630,924 B2 | 1/2014 | Groenevelt et al. |
| 8,688,598 B1 | 4/2014 | Shakes et al. |
| 9,473,747 B2 | 10/2016 | Kobres et al. |
| 10,382,973 B1 * | 8/2019 | Apostolopoulos .... H04W 24/02 |
| 2003/0002712 A1 | 1/2003 | Steenburgh et al. |
| 2004/0181467 A1 | 9/2004 | Raiyani et al. |
| 2008/0055087 A1 | 3/2008 | Horii et al. |
| 2008/0077511 A1 | 3/2008 | Zimmerman |

(Continued)

OTHER PUBLICATIONS

Wifibond, "802.11 Association process," dated Apr. 8, 2017, available at https://wifibond.com/2017/04/08/802-11-association-process/, 3 pages.

(Continued)

*Primary Examiner* — Christopher R Crompton
(74) *Attorney, Agent, or Firm* — Athorus, PLLC

(57) ABSTRACT

An access point to the Internet or another network is programmed with a set of rules for establishing or limiting a number or type of client device with which the access point may associate itself. The set of rules may be subjectively defined for a single access point in a network, or objectively defined for each of the access points in the network. The set of rules may further include static rules such as overall limits on numbers of clients, types of clients, or amounts or rates of data transfer, or dynamic rules that change over time, and may be modified to account for loading on one or more of the access points, thereby enabling each of the access points to be placed in an optimal configuration.

20 Claims, 12 Drawing Sheets

(56) References Cited

U.S. PATENT DOCUMENTS

| | | |
|---|---|---|
| 2008/0109114 A1 | 5/2008 | Orita et al. |
| 2009/0121017 A1 | 5/2009 | Cato et al. |
| 2009/0245573 A1 | 10/2009 | Saptharishi et al. |
| 2011/0011936 A1 | 1/2011 | Morandi et al. |
| 2012/0284132 A1 | 11/2012 | Kim et al. |
| 2013/0076898 A1 | 3/2013 | Philippe et al. |
| 2013/0201857 A1* | 8/2013 | Bhargava ............ H04K 3/28 370/252 |
| 2013/0253700 A1 | 9/2013 | Carson et al. |
| 2014/0279294 A1 | 9/2014 | Field-Darragh et al. |
| 2014/0362223 A1 | 12/2014 | LaCroix et al. |
| 2015/0019391 A1 | 1/2015 | Kumar et al. |
| 2015/0073907 A1 | 3/2015 | Purves et al. |
| 2016/0007278 A1* | 1/2016 | Gupta ............ H04W 48/20 370/329 |
| 2020/0012748 A1* | 1/2020 | Ganesan ............ H04L 67/22 |

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

Cristian Pop, "Introduction to the BodyCom Technology", Microchip AN1391, May 2, 2011, pp. 1-24, vol. AN1391, No. DS01391A, Publisher: 2011 Microchip Technology Inc.

\* cited by examiner

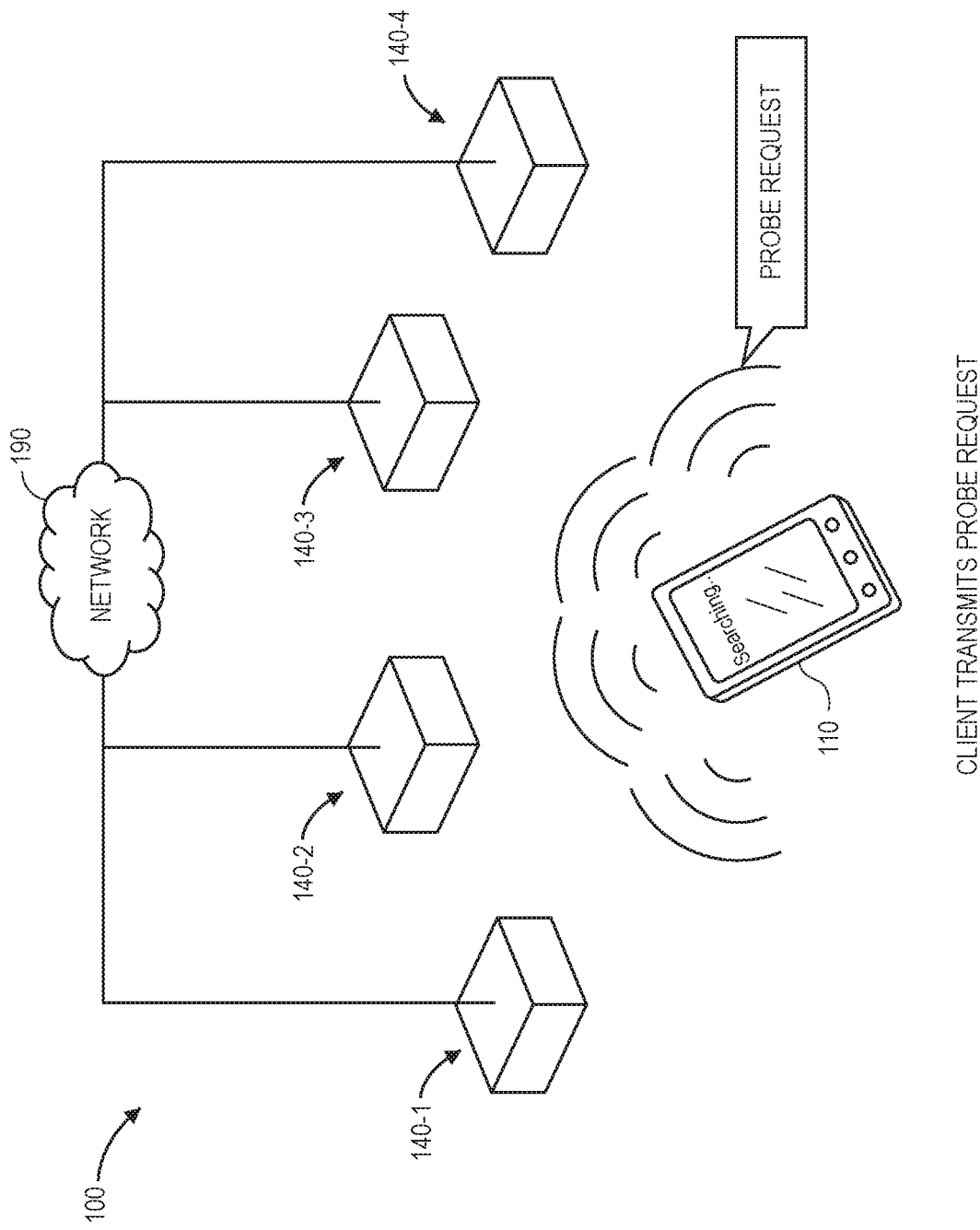

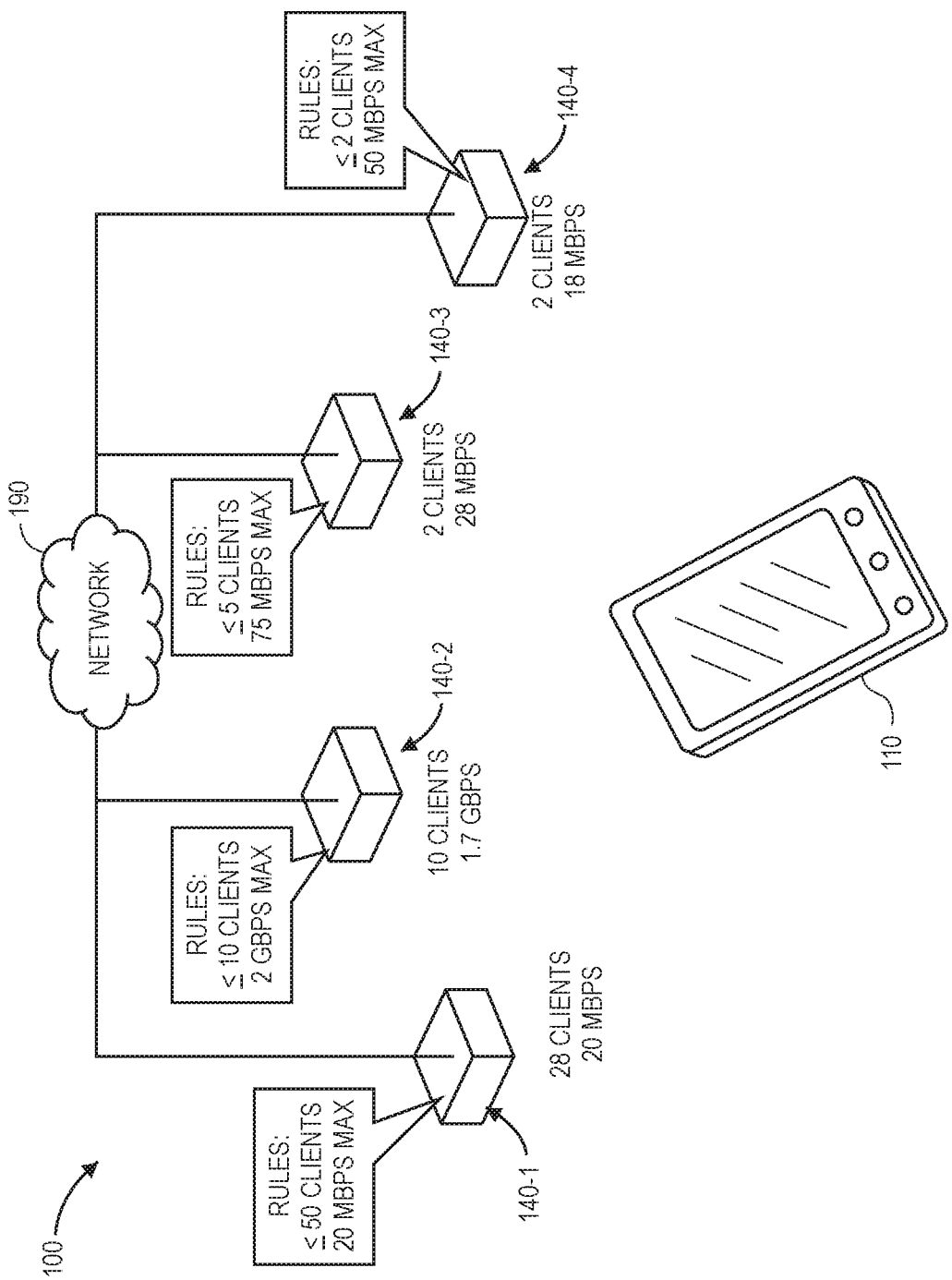

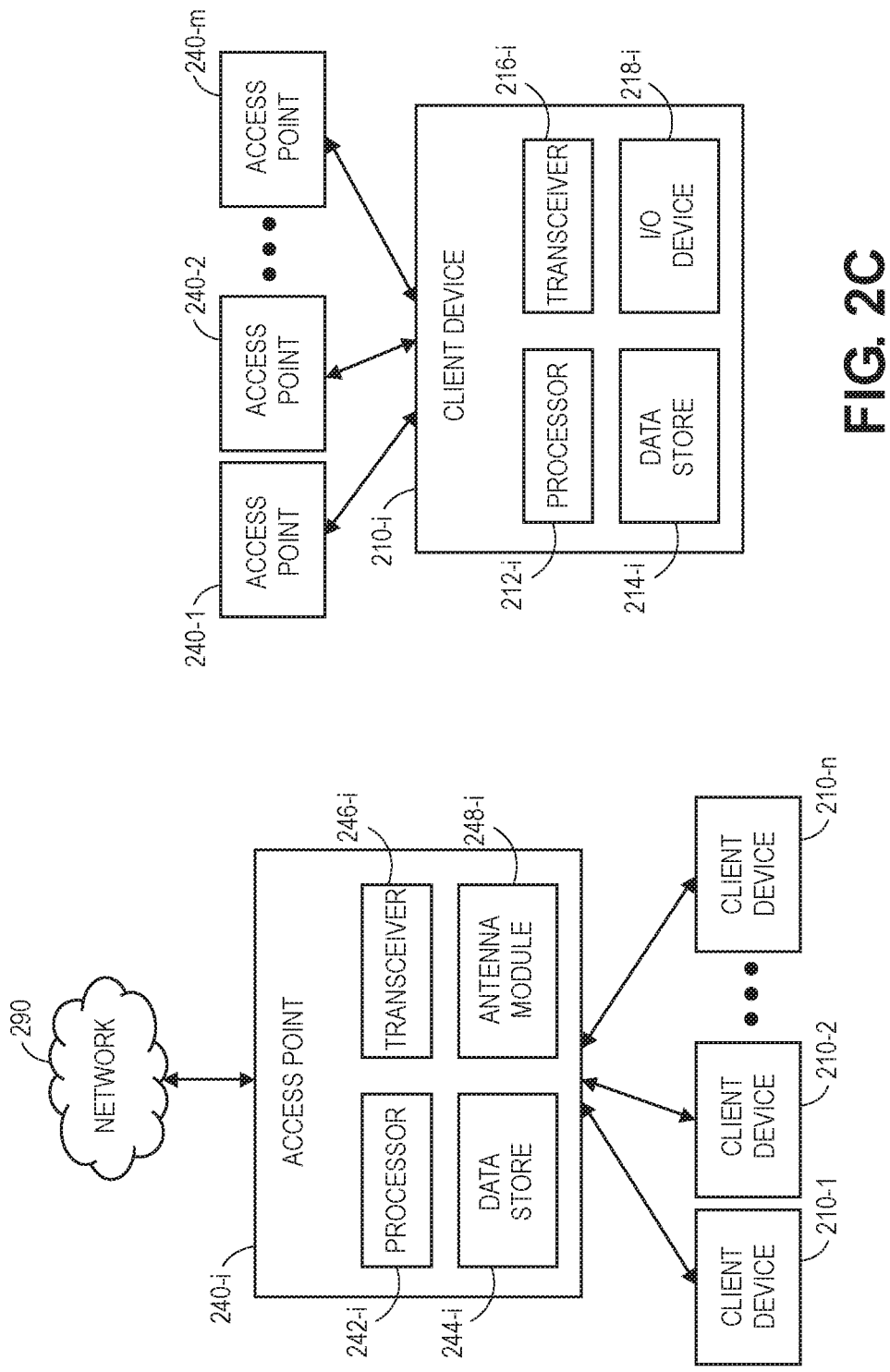

INFRASTRUCTURE-BASED ACCESS POINT LOAD BALANCING

BACKGROUND

From its origins as a large-scale patch-switching network of government computers that was established during the Cold War, the Internet has evolved to a versatile and flexible staple of our way of life. Network connectivity has been expanded to include academic institutions, home computers, mobile computers and telephones, e.g., "smartphones," over time, in progressively faster connections having increased speed and reliability. Today, the number and types of machines that may access the Internet or other networks continue to grow, as a wide array of devices including but not limited to televisions, refrigerators, automobiles, home security systems and even wristwatches may now access networks via wireless access points that are increasingly common in countless locations, and in indoor or outdoor settings.

Client devices and wireless access points typically engage in a structured handshake prior to associating themselves with one another. An access point to a network may typically transmit one or more frames of data (e.g., beacon frames) that declare its existence to any wireless-enabled client devices within its vicinity. Such frames may be transmitted at various intervals, and include headers, bodies and checksums or check sequences, or other data. The frames may describe one or more attributes of the network, including but not limited to the network's capacity to transfer data to or receive data from a client device. Meanwhile, a client device, which may sometimes be called a "station," may transmit probe requests identifying the client device's rates of data transfer, network capabilities, or other attributes. Typically, when an access point receives a probe request, the access point transmits a probe response including information regarding a network to which the access point is connected, as well as values or descriptors of the access point's data transfer rates and encryption types.

Traditionally, roaming within a wireless medium is subject to the discretion of a client device or its user. Guided by information received from access points in probe responses, the client device or the user may select an access point and initiate authentication and association processes. However, a client device and its user are unaware of how many other client devices are associated with a given access point, the rates of data transferred by such other client devices, or the operations in which such other client devices may be engaged.

BRIEF DESCRIPTION OF THE DRAWINGS

FIGS. 1A through 1D are views of aspects of one system for access point load balancing in accordance with implementations of the present disclosure.

FIGS. 2A through 2C are block diagrams of one system for access point load balancing in accordance with implementations of the present disclosure.

DETAILED DESCRIPTION

As is set forth in greater detail below, the present disclosure is directed to balancing loads on access points to a network. More specifically, the present disclosure is directed to network infrastructures that enable operators of networks to establish discrete sets of rules to be followed by each of the points of access (e.g., access points) to a network in determining whether to respond to probe requests received from client devices of any size, type or configuration, or in identifying conditions that must be met prior to transmitting one or more responses to such requests. The systems and methods of the present disclosure enable operators of such networks to ensure that client devices do not associate with selected access points, or that client devices only associate with desired or preferred access points, based on one or more subjective or objective rules that may be static or dynamic in nature, and selected to determine whether an access point enables a client device to associate itself with the access point or whether the access point declines to respond to a probe request.

Figure 1B:
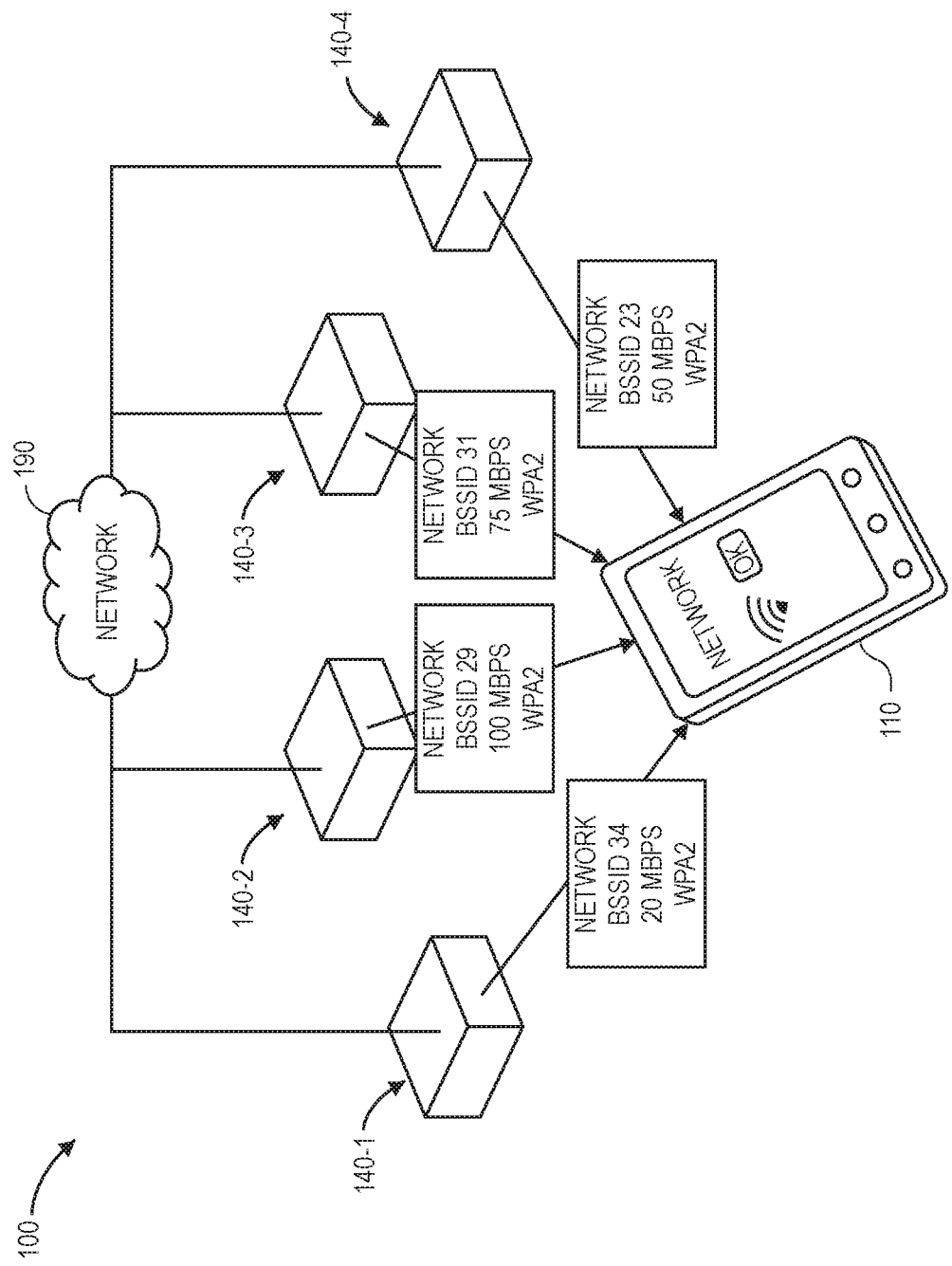

Referring to FIGS. 1A through 1D, views of aspects of one system for access point load balancing in accordance with implementations of the present disclosure are shown. As is shown in FIG. 1A, a system 100 includes a mobile device 110 (e.g., a smartphone, a tablet or any other type or form of computer device) and a plurality of access points 140-1, 140-2, 140-3, 140-4. Each of the access points 140-1, 140-2, 140-3, 140-4 may be a wireless router, a "hot spot," an antenna system, or any other device that enables communication with any number of networks, such as a network 190, which may include the Internet in whole or in part.

In some implementations, the access points 140-1, 140-2, 140-3, 140-4 may be equipped with one or more processors, components, transceivers, sensors or other systems for engaging in communications with client devices, e.g., the mobile device 110 and others (not shown), and with any other external computer devices (not shown) via the network 190, or via any number of other networks. For example, the access points 140-1, 140-2, 140-3, 140-4 may each include any number of transceivers or other systems for communicating via any wired or wireless protocols, standards or specifications, including but not limited to Wireless Fidelity (or "Wi-Fi"), near-field communication (or "NFC"), Bluetooth®, or any other type of protocols, standards or specifications.

In some implementations, each of the access points 140-1, 140-2, 140-3, 140-4 may be configured to operate according to the 802.11 family of protocols, standards or specifications for Wi-Fi communications over one or more networks (e.g., local area networks). Additionally, the access points 140-1, 140-2, 140-3, 140-4 may be homogenous or heterogeneous in nature, such that each of the access points 140-1, 140-2, 140-3, 140-4 has one or more attributes or features in common with any number of the other access points 140-1, 140-2, 140-3, 140-4.

As is shown in FIG. 1A, the mobile device 110 may attempt to access the network 190 by associating itself with one or more of the access points 140-1, 140-2, 140-3, 140-4. For example, in some implementations, the mobile device 110 may actively transmit a probe request, or a frame or another set of data that is directed to a specific access point, e.g., one or more of the access points 140-1, 140-2, 140-3, 140-4 or others (not shown), or to any access points in general, in an effort to identify any access points that may communicate with the mobile device 110 according to a common protocol, standard or specification. The probe request may include any information regarding a capacity of the mobile device 110 to transmit or receive data, or to identify one or more protocols, standards or specifications by which the mobile device 110 is configured to communicate. Alternatively, in some implementations, the mobile device 110 may be configured to passively scan for beacon frames or other transmissions of information from access points within a vicinity of the mobile device 110, and need not transmit a probe request. Alternatively, in some other implementations, the mobile device 110 may transmit a probe request that specifically identifies a preferred network, or a preferred access point.

Traditionally, an access point that receives a probe request, such as the probe request transmitted by the mobile device 110 as shown in FIG. 1A, responds to the probe request with information or data regarding its compatibility with the mobile device 110. In particular, and as is shown in FIG. 1B, in accordance with one or more prior art systems or methods, each of the access points 140-1, 140-2, 140-3, 140-4 transmits a probe response identifying a service set or network, e.g., by a Service Set Identifier (or "SSID"), as well as an identifier of the respective one of the access points 140-1, 140-2, 140-3, 140-4, e.g., a Basic SSID (or "BSSID") or media access control address (or "MAC" address), and a maximum data transfer rate, an encryption type or other data. According to the prior art, the access points 140-1, 140-2, 140-3, 140-4 shown in FIG. 1B, transmit the probe responses to the mobile device 110 without regard to a number of client devices with which the access points 140-1, 140-2, 140-3, 140-4 are already associated, any attributes of the mobile device 110, a type of data that the mobile device 110 intends to transmit or receive, or any other factor.

In accordance with implementations of the present disclosure, however, each of the access points 140-1, 140-2, 140-3, 140-4 may be programmed with a discrete set of rules for determining whether or how the respective access points 140-1, 140-2, 140-3, 140-4 provides a probe response upon receiving a probe request from a client device, such as the mobile device 110. In some implementations, the access points 140-1, 140-2, 140-3, 140-4 may be programmed with rules sets that include any number of rules, including as few as one rule.

As is shown in FIG. 1C, each of the access points 140-1, 140-2, 140-3, 140-4 determines its respective state with respect to the discrete rules sets upon receiving the probe request. For example, the access point 140-1 is programmed with rules limiting its associations to not more than fifty client devices, and limiting a throughput to a maximum of twenty megabits per second (Mbps). Upon receiving the probe request, the access point 140-1 is associated with twenty-eight clients, and has a total throughput of approximately twenty megabits per second (Mbps). Thus, because the access point 140-1 has a throughput of twenty megabits per second (Mbps) at the time that the probe request is received, associating with the mobile device 110 would cause the access point 140-1 to exceed a maximum level of throughput defined by the rules set with which the access point 140-1 has been programmed.

Similarly, as is also shown in FIG. 1C, the access point 140-2 is programmed with rules limiting its associations to not more than ten client devices, and limiting a throughput to a maximum of two gigabits per second (Gbps), while the access point 140-3 is programmed with rules limiting its associations to not more than five client devices, and limiting a throughput to a maximum of seventy-five megabits per second (Mbps), and the access point 140-4 is programmed with rules limiting its associations to not more than two client devices, and limiting a throughput to a maximum of fifty megabits per second (Mbps). Because the access point 140-2 is associated with ten clients at the time that the probe request is received, associating with the mobile device 110 would cause the access point 140-2 to exceed a maximum number of clients defined by the rules set with which the access point 140-2 has been programmed. Likewise, because the access point 140-4 is associated with two clients at the time that the probe request is received, associating with the mobile device 110 would cause the access point 140-4 to exceed a maximum number of clients defined by the rules set with which the access point 140-4 has been programmed.

However, as is further shown in FIG. 1C, the access point 140-3 is associated with two clients at the time that the probe request is received, or three fewer than the maximum number of five clients defined by the rules set with which the access point 140-3 has been programmed. The access point 140-3 also has a throughput of twenty-eight megabits per second (Mbps) at the time that the probe request is received, or less than the seventy-five megabits per second maximum throughput defined by the rules set with which the access point 140-3 has been programmed.

Figure 1D:
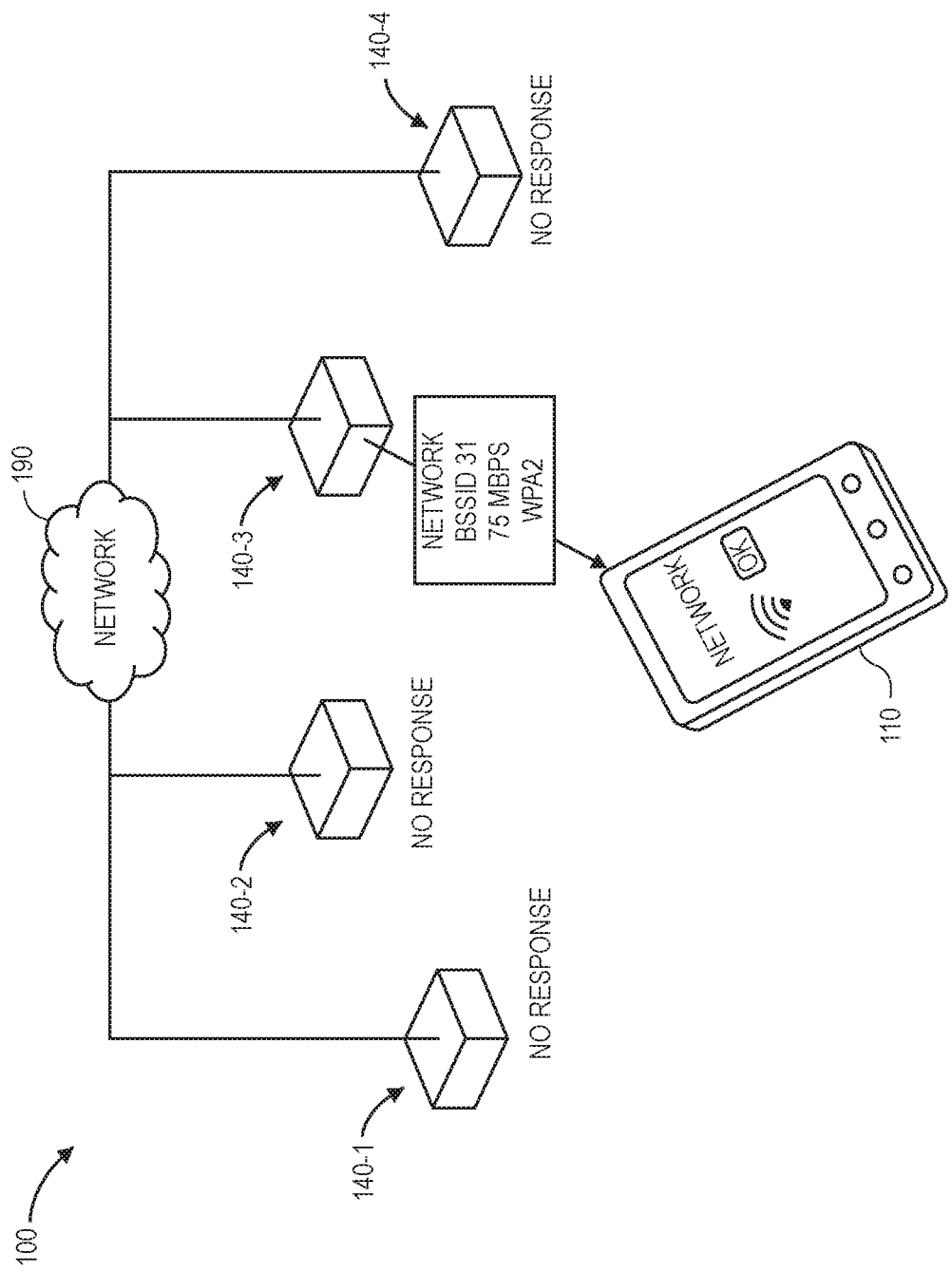

Therefore, as is shown in FIG. 1D, and in accordance with implementations of the present disclosure, the access point 140-3, which is capable of accommodating a connection with the mobile device 110, generates and transmits a probe response in reply to the probe request. The probe response generated and transmitted by the access point 140-3 includes an identifier of the network 190 (e.g., an SSID of the network 190), as well a BSSID or MAC address of the access point 140-3, a maximum data transfer rate for the access point 140-3 and an encryption type for the access point 140-3. Upon receiving the probe response from the access point 140-3, the mobile device 110 may then continue a handshake process with the access point 140-3, such as by transmitting an authentication request (e.g., one or more frames) to the access point 140-3. The authentication request may include an identifier of a transceiver or other controller, e.g., a MAC address, of the mobile device 110, or any other information or data, such as one or more identifiers of the information or data. Alternatively, where two or more access points had been identified as capable of accommodating a connection with the mobile device 110, the mobile device 110 may select one or more of such access points, e.g., the access point 140-3 or any other access point that is configured to associate with the mobile device 110, and transmit the authentication request to the selected one of the access points. Meanwhile, in accordance with implementations of the present disclosure, and as is also shown in FIG. 1D, the access points 140-1, 140-2, 140-4 do not return probe responses in reply to the probe request.

The access point 140-3 may respond to the authentication request by returning an authentication response, e.g., one or more frames including an authentication algorithm identification field or other field, a sequence number, a status code, or any other information or data. The mobile device 110 may then, upon receiving the authentication response, transmit an association request to a selected access point, viz., the access point 140-3, and the association request may include one or more selected encryption types, as well as one or more compatible network protocols for the mobile device 110. Upon confirming that the association request is consistent with its capabilities, the access point 140-3 may return an association response to the mobile device 110. The association response may include an association identification number for the mobile device 110, as well as an indication that network access has been granted to the mobile device 110 by the access point 140-3.

Accordingly, the systems and methods of the present disclosure may manage the loading applied to access points to one or more networks by programming the respective access points with sets of rules governing whether or how such access points may generate and transmit probe responses in response to probe requests, or whether the access points may decline to provide any probe responses in response to probe requests. The sets of rules may include any number of rules, including as few as one. In some implementations, the access points may be programmed with one or more objective rules, e.g., rules that apply substantially equally or consistently to each of the access points, or with one or more subjective rules, e.g., rules that apply to the respective attributes or features of a given access point. Likewise, in some implementations, the rules may be static in nature, such that the rules do not change or change infrequently, or dynamic in nature, such that the rules may vary based on any number of factors including but not limited to loading conditions on a given access point or others.

The systems and methods of the present disclosure may be implemented in association with access points to any type or form of network, and any number of networks, including but not limited to local area networks, intranets or the Internet, or any other networks. The access points are preferably programmable in nature, and may include one or more processors as well as one or more memory components or data stores that may be programmed with one or more sets of instructions and with one or more sets of rules. Such instructions, when executed by one or more processors, may cause the access points to perform one or more of the functions described herein, including but not limited to the receipt and interpretation of probe requests, the comparison of contents of probe requests to one or more rules of a set, the transmission of probe responses where such contents comply with the one or more rules of the set. Additionally, the access points may further be configured to receive modifications or revisions to one or more rules of a set.

The access points of the present disclosure may be outfitted with one or more transceivers (e.g., transmitters and/or receivers) for communicating according to any number of protocols, e.g., over any communications network and in accordance with any protocol, including but not limited to Wi-Fi or any other radio frequency waves or signals, at any frequencies or power levels, such as NFC signals, Bluetooth® signals, or any other type of wired or wireless signals.

Additionally, the access points of the present disclosure may take any shape or form. For example, an access point may be a wireless router, a "hot spot," an antenna system, or any other system. The access points of the present disclosure may take any shape, such as a substantially rectangular solid object having a housing or other structure formed from one or more plastics of any density or rigidity, including but not limited to thermoplastics or thermosetting plastics such as epoxy or phenolic resins, polyurethanes or polyesters, as well as polyethylenes, polypropylenes or polyvinyl chlorides, or acrylonitrile butadiene styrenes. Alternatively, the access points may be enclosed within housings or other structures formed from any other materials, including but not limited to woods, metals, composite materials, papers or paperboards (e.g., cardboard) or any other materials, and enclosed with or by one or more lips, rims (e.g., a snap-fit construction), glues, sealants, bands, adhesive layers or other materials. Dimensions, shapes, thicknesses and/or volumes of the access points disclosed herein may be selected on any basis or criterion. Furthermore, the access points may include one or more holes, bores or other openings, or other structural features, which may aid in mounting the access points to a substantially rigid fixture, e.g., by one or more bolts, screws, rivets, nails or other like fasteners, or by one or more belts, straps, bands, clamps, clips or any other tension or compression members. In some implementations, the components of access points described herein may be provided without a housing or other structure.

The access points of the present disclosure may be mounted on walls, ceilings, roofs or other surfaces of any type or form of facility, e.g., in locations where an access point may remain in a communications range of one or more client devices, such as is shown in FIG. 1A. For example, an access point may be provided in association with any working area or environment, building, region, structure or other space (e.g., covered or uncovered) where access to one or more networks may be desired, such as a business-related structure such as an office, a shopping center, a restaurant (e.g., a coffee shop), a materials handling facility, a post office, a grocery store, a department store, or any other defined or undefined structure having one or more commercial areas. Alternatively, an access point may be provided in association with a home of any type, kind, shape or form (e.g., a house, an apartment, a condominium, a dormitory, or any other defined or undefined structure having one or more living spaces), as well as indoor or outdoor forums or facilities such as stadiums, ballfields, parks (or other open spaces), transportation centers or financial institutions (e.g., banks).

Furthermore, an access point may be configured to connect with any number of networks (e.g., the Internet) by any wired or wireless connections, and in accordance with any protocols, standards or specifications. For example, in some implementations, an access point may be configured to communicate by way of any Institute of Electrical and Electronics Engineers (or "IEEE") standards, including but not limited to any of the IEEE 802 family of protocols, standards or specifications, and more specifically any of the IEEE 802.11 protocols, standards or specifications.

The access points of the present disclosure may be further configured to associate with any type or form of client device, such as any number of general-purpose or special-purpose machines that are configured to perform one or more functions. For example, the access points of the present disclosure may be configured to associate with personal computing devices such as desktop computers, laptop computers, mobile devices (e.g., smartphones or tablets) or smart speakers, as well as appliances or systems such as televisions, set-top boxes, audio or video equipment, refrigerators, ovens, telephones, garage door openers, security systems, lights, switches, locks, or others.

In addition to communications systems or components such as processors, memory components or data stores, or transceivers, the access points of the present disclosure may further include any number of sensors such as digital cameras or other imaging devices, acoustic sensors (e.g., microphones), or power modules (e.g., batteries), which may be rechargeable, refuelable or replaceable in nature.

Figure 2A:
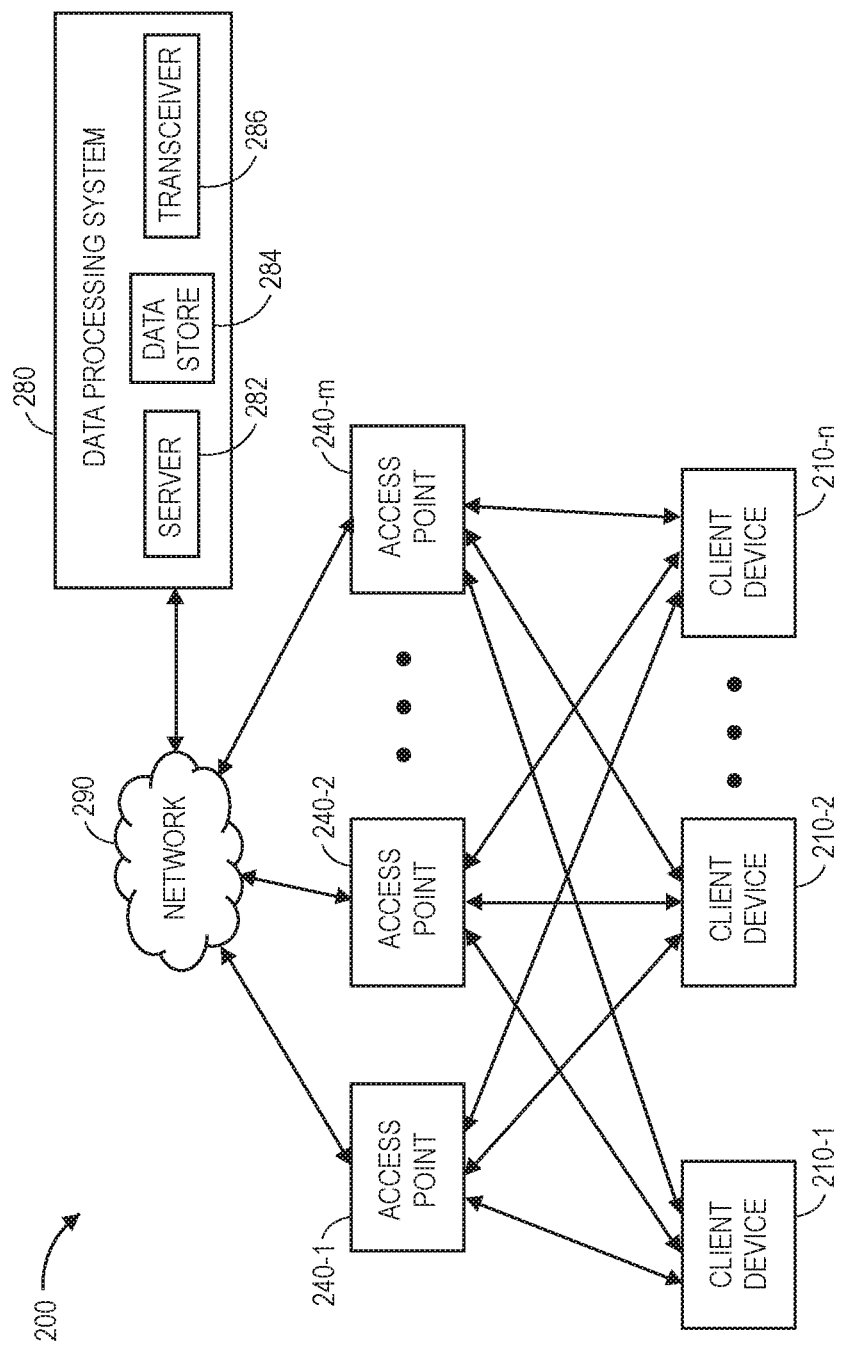

Referring to FIGS. 2A through 2C, block diagrams of one system for access point load balancing in accordance with implementations of the present disclosure are shown. The system 200 includes a plurality of client devices 210-1, 210-2 . . . 210-n, a plurality of access points 240-1, 240-2 . . . 240-m and a data processing system 280. Except where otherwise noted, reference numerals preceded by the number "2" in FIGS. 2A through 2C refer to elements that are similar to elements having reference numerals preceded by the number "1" shown in FIGS. 1A through 1D.

Each of the access points 240-1, 240-2 . . . 240-m is configured to associate with any or all of the client devices 210-1, 210-2 . . . 210-n, and to enable such client devices 210-1, 210-2 . . . 210-n to communicate with one or more external computer devices or systems, e.g., the data processing system 280 or others (not shown), over a network 290, which may include the Internet in whole or in part. For example, each of the access points 240-1, 240-2 . . . 240-m may be a wireless router, a "hot spot," an antenna system, or any other device or component that is configured to enable communication over the network 290.

A representative one of the access points 240-1, 240-2 . . . 240-m is shown in FIG. 2B as an access point 240-i. The access point 240-i includes one or more processors 242-i, one or more data stores (or memory components) 244-i, one or more transceivers 246-i and one or more antenna modules 248-i. In some implementations, one or more of the components of the access point 240-i may be provided on a circuit board or card, e.g., a network interface card.

The processors 242-i may be configured to execute one or more sets of instructions, which may be stored in the one or more data stores 244-i or elsewhere, for causing the access point 240-i to perform any of the functions or operations described herein. For example, in some implementations, the processor 242-i may generate one or more frames of data corresponding to a probe response, an authentication response or an association response, and cause such frames of data to be transmitted by the transceivers 246-i, as necessary. In some other implementations, however, the processor 242-i may interpret one or more frames of data, which may correspond to a probe request, an authentication request, or an association request, as necessary.

The transceivers 246-i may be configured to enable the access point 240-i to receive or transmit information or data to or from the data processing system 280, or any other computing device, over the network 290. For example, the transceivers 246-i may be configured to communicate through one or more wired or wireless means, e.g., wired technologies such as Universal Serial Bus (or "USB") or fiber optic cable, or standard wireless protocols, standards or specifications such as Bluetooth® or any Wi-Fi protocol, such as over the network 290 or directly. The transceivers 246-i may also be configured to enable the access point 240-i to communicate with any of the client devices 210-1, 210-2 . . . 210-n according to any wireless protocols, standards or specifications such as Bluetooth® or Wi-Fi (or "Wi-Fi") protocol. For example, the transceivers 246-i may be configured to communicate according to the 802.11 family of protocols, standards or specifications for Wi-Fi communications over one or more networks (e.g., local area networks). The transceivers 246-i may perform any necessary protocol, timing or other data transformations in order to convert data signals from a first format suitable for use by one component into a second format suitable for use by another component. For example, in some implementations, the transceivers 246-i may include support for devices attached through various types of peripheral buses, e.g., variants of the Peripheral Component Interconnect (PCI) bus standard or the Universal Serial Bus (USB) standard. In some other implementations, functions of the transceivers 246-i may be split into two or more separate components, or incorporated directly into the processors 242-i. Additionally, the transceivers 246-i may be configured to operate or perform any type of encryption and on any basis.

The antenna module 248-i may be one or more components for transmitting or receiving information or data from one or more other components or systems, e.g., over the network 290 or directly. For example, the antenna module 248-i may be configured to transmit one or more signals in any direction (e.g., a single direction or omnidirectional), or receive one or more signals from any direction, and at any frequency range or in accordance with any protocol, standard or specification.

Additionally, the access point 240-i may further include any type of power source for providing electrical power or other forms of power in support of one or more electrical loads. Such power sources may include, for example, one or more batteries or other power cells, e.g., dry cell or wet cell batteries such as lead-acid batteries, lithium ion batteries, nickel cadmium batteries or nickel metal hydride batteries, or any other type, size or form of batteries, and may each have any cell voltages, peak load currents, charge times, specific energies, internal resistances or cycle lives, or other power ratings. The access point 240-i may also include any type, size or form of other power source, e.g., other than a battery, including but not limited to one or more fuel cells or solar cells.

The access point 240-i may further include one or more feedback devices configured for returning feedback to any other individuals or entities associated with the system 200. Such feedback devices may be installed in the same common unit as the one or more processors 242-i, data stores 244-i, transceivers 246-i and/or antenna modules 248-i, or in one or more units provided in association with (and in communication with) such components, subject to functional or spacing limitations or constraints. Such feedback devices may include one or more individually addressable lighting elements (e.g., LED lights) that may be automatically controlled or configured to emit light in any frequency, intensity or hue, as well as any audio speakers or other physical components that may be automatically controlled or configured to transmit audible messages, signals or sounds.

A representative one of the client devices 210-1, 210-2 . . . 210-n is shown in FIG. 2C as a client device 210-i. The client device 210-i includes one or more processors 212-i, one or more data stores (or memory components) 214-i, one or more transceivers 216-i and one or more input/output ("I/O") devices 218-i.

The client device 210-i may be any type or form of computing device (e.g., a smartphone, a tablet computer, a laptop computer, a desktop computer, or computing devices provided in wristwatches, televisions, set-top boxes, automobiles or any other appliances or machines), or any other machine. The processors 212-i may be configured to execute one or more sets of instructions, which may be stored in the one or more data stores 214-i or elsewhere, for causing the client device 210-i to perform any of the functions or operations described herein. For example, in some implementations, the processor 212-i may generate one or more frames of data corresponding to a probe request, an authentication request or an association request, and cause such frames of data to be transmitted by the transceivers 216-i, as necessary. In some other implementations, however, the processor 212-i may interpret one or more frames of data, which may correspond to a probe response, an authentication response, or an association response, as necessary.

The processor 212-*i* may be configured to perform any type or form of computing function, including but not limited to the execution of one or more machine learning algorithms or techniques, for controlling any aspects of the operation of the client device 210-*i* and any computer-based components thereon, such as the data stores 214-*i*, the transceivers 216-*i*, or the I/O devices 218-*i*. The processor 212-*i* may further control any aspects of the operation of any number of additional components that may be provided on the client device 210-*i*, e.g., one or more other sensors, illuminators (e.g., lights), or the like. In some embodiments, the processor 212-*i* may be configured to initiate a handshake with one or more of the access points 240-1, 240-2 . . . 240-*m*, e.g., by exchanging one or more packets of information or data with the access points 240-1, 240-2 . . . 240-*m*, using the transceiver 216-*i*. A successfully completed handshake may open up a communications channel between the client device 210-*i* and one or more of the access points 240-1, 240-2 . . . 240-*m*.

In some embodiments, the processor 212-*i* may be configured to determine that a handshake has been accepted or refused by one or more access points 240-1, 240-2 . . . 240-*m*, and to execute one or more actions in response to the acceptance or refusal, e.g., to transfer data according to one or more protocols or standards, such as Transmission Control Protocol (or "TCP"), Transport Layer Security (or "TLS"), Secure Sockets Layer ("or "SSL"), or the others.

The processor 212-*i* may be a uniprocessor system including one processor, or a multiprocessor system including several processors (e.g., two, four, eight, or another suitable number), and may be capable of executing instructions. For example, in some embodiments, the processor 212-*i* may be a general-purpose or embedded processor implementing any of a number of instruction set architectures (ISAs), such as the x86, PowerPC, SPARC, or MIPS ISAs, or any other suitable ISA. Where the processor 212-*i* is a multiprocessor system, each of the processors within the multiprocessor system may operate the same ISA, or different ISAs.

The data stores 214-*i* may be further configured to store any other data items accessible by or to the processor 212-*i*. The data stores 214-*i* may be implemented using any suitable technology, such as static random access memory (SRAM), synchronous dynamic RAM (SDRAM), nonvolatile/Flash-type memory, or any other type of memory. Information or data stored in the data stores 214-*i* may be generated by the client device 210-*i*, or received or transmitted via the transceiver 216-*i*, e.g., by transmission media or signals, such as electrical, electromagnetic, or digital signals, which may be conveyed via a communication medium such as a wired and/or a wireless link.

The transceiver 216-*i* may be configured to transmit and/or receive Wi-Fi signals, Bluetooth® signals, NFC signals, or any other type or form of signals within any frequency spectra or having any intensity or center frequency. The transceiver 216-*i* may include any number of processors, chips (e.g., chipsets) or other components that are commonly associated with or required for communication according to a selected communications protocol or standard, or programmed as necessary (e.g., with one or more applications and/or sets of instructions) in order to communicate according to the selected protocol or standard. The signals transmitted and/or received by the transceiver 216-*i* may be of any kind or type, and may be sent over the one or more networks 290 or directly to one or more of the access points 240-1, 240-2 . . . 240-*m*.

The I/O device 218-*i* may be configured to receive and provide information to human users of the client device 210-*i* and may include, but is not limited to, a display, (e.g., a touch-screen display), a scanner, a keyboard, a keypad, a biometric scanner, an audio transducer, one or more speakers, one or more imaging devices such as a video camera, and any other types of input or output devices that may support interaction between the client device 210-*i* and a human operator. The client device 210-*i* may further include one or more displays or other types or forms of systems for electronically displaying information, including but not limited to an electronic ink display, a liquid crystal display (or "LCD"), a light-emitting diode (or "LED") display, or an organic light-emitting diode (or "OLED") display.

The data processing system 280 includes one or more physical computer servers 282 having one or more computer processors and any number of data stores 284 (e.g., databases) associated therewith, as well as provided for any specific or general purpose. For example, the data processing system 280 of FIGS. 2A through 2C may be independently provided for the exclusive purpose of receiving, analyzing or storing information or data received from any source or, alternatively, provided in connection with one or more physical or virtual services configured to receive, analyze or store such imaging data or other information or data, as well as one or more other functions. The servers 282 may be connected to or otherwise communicate with the data stores 284, which may store any type of information or data, including but not limited to acoustic signals, imaging data, or other information or data, for any purpose. The servers 282 may also connect to or otherwise communicate with the network 290 through the sending and receiving of digital data. For example, the data processing system 280 may include any facilities, stations or locations having the ability or capacity to receive and store information or data, such as media files, from one another, or from one or more other external computer systems (not shown) via the network 290. In some embodiments, the data processing system 280 may be provided in a physical location. In other such embodiments, the data processing system 280 may be provided in one or more alternate or virtual locations, e.g., in a "cloud"-based environment. In still other embodiments, the data processing system 280 may be provided onboard one or more aerial vehicles.

The transceivers 286 may be configured to enable the data processing system 280 to receive or transmit information or data to or from any of the access points 240-1, 240-2 . . . 240-*m*, or any other computing device, over the network 290. For example, the transceivers 286 may be configured to communicate through one or more wired or wireless means, e.g., wired technologies such as Universal Serial Bus (or "USB") or fiber optic cable, or standard wireless protocols, standards or specifications such as Bluetooth® or any Wi-Fi protocol, such as over the network 290 or directly. The transceivers 286 may also be configured to enable the data processing system 280 to communicate with any of the client devices 210-1, 210-2 . . . 210-*n* according to any wireless protocols, standards or specifications such as Bluetooth® or Wi-Fi protocol, by way of the access points 240-1, 240-2 . . . 240-*m*.

For example, the transceivers 286 may be configured to communicate according to the 802.11 family of protocols, standards or specifications for Wi-Fi communications over one or more networks (e.g., local area networks). The transceivers 286 may perform any necessary protocol, timing or other data transformations in order to convert data signals from a first format suitable for use by one component into a second format suitable for use by another component. For example, in some implementations, the transceivers 286 may include support for devices attached through various types of peripheral buses, e.g., variants of the Peripheral Component Interconnect (PCI) bus standard or the Universal Serial Bus (USB) standard. In some other implementations, functions of the transceivers 286 may be split into two or more separate components, or incorporated directly into the server 282. Additionally, the transceivers 286 may be configured to operate or perform any type of encryption and on any basis.

The network 290 may be any wired network, wireless network, or combination thereof, and may comprise the Internet in whole or in part. In addition, the network 290 may be one or more of a personal area network, local area network, wide area network, cable network, satellite network, cellular telephone network, or combination thereof. The network 290 may also be a publicly accessible network of one or more linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The data and/or computer-executable instructions, programs, firmware, software and the like (also referred to herein as "computer-executable" components) described herein may be stored on a computer-readable medium that is within or accessible by computers or computer components such as the processors 212-*i*, 242-*i*, the servers 282, the data stores 214-*i*, 244-*i*, 284, or the transceivers 216-*i*, 246-*i*, 286, or any other computers or control systems having sequences of instructions which, when executed by a processor (e.g., a central processing unit, or "CPU"), cause the processor to perform all or a portion of the functions, services and/or methods described herein. Such computer-executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
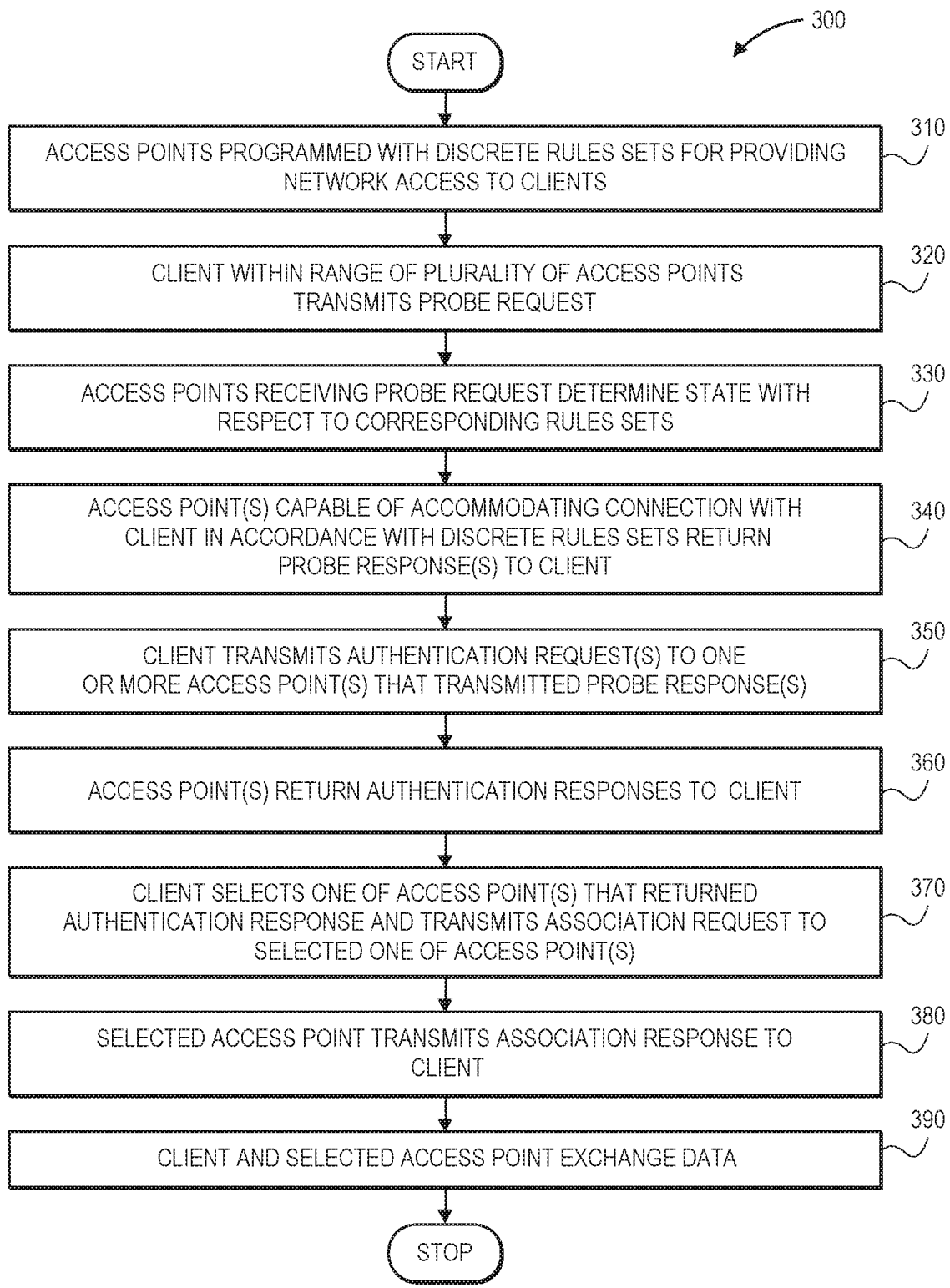
FIG. 3 is a flow chart of one process for access point load balancing in accordance with implementations of the present disclosure.

As is discussed above, access points may be programmed with one or more sets of rules to control whether a client device will be permitted to associate itself with a given access point. In this regard, loading on a variety of access points within a network infrastructure may be balanced by establishing rules that govern whether any of the access points will, or will not, respond to probe requests received from one or more of the client devices. Referring to FIG. 3, a flow chart of one process for access point load balancing in accordance with implementations of the present disclosure is shown.

At box 310, a plurality of access points are programmed with discrete rules sets for providing network access to one or more clients. For example, a set of rules may be established for an access point based on a physical location of the access point, as well as any operational attributes or features of the access point, e.g., a maximum number of clients that may be associated with the access point, or a maximum throughput of the access point. A set of rules may also be established based on any fixed or variable factors relating to times, dates or other occasions associated with intended uses of a given access point, or other access points, within a network infrastructure, such as operating hours or maintenance schedules. A set of rules may also relate to a type of client device that may request association with a given access point, or a type of data to be transmitted or received by the access point. A set of rules may further relate to past histories of a user or a client device, e.g., based on an identifier of the user or of the client device. For example, one or more rules of a set may relate to a history of types of data previously sent or received by the client device or other client devices associated with the user, or a history of compliance with one or more other rules by the user or the client device.

Once the access points have been programmed with the one or more sets of rules, the access points may grant network access to one or more client devices. For example, in some implementations, a client device may actively transmit a probe request, and an access point may respond to the probe request with a probe response. A client device may further request and receive authentication to communicate with an access point, and the access point may permit the client device to associate with the access point. Alternatively, in some implementations, an access point may transmit one or more beacon frames that include an identification of a service set or network (e.g., an SSID) or a MAC address, or any other information or data, and a client may passively receive and interpret the beacon frames from the access points and select an access point having a strongest receiver signal strength, or on any other basis.

At box 320, a client within range of one or more of the plurality of access points transmits a probe request, e.g., according to one or more protocols, standards or specifications of the IEEE 802.11 family. For example, in some implementations, the client may transmit one or more frames containing an identifier (e.g., an SSID) of a specific service set or network, or may attempt to identify each of the service sets or networks (e.g., SSIDs) within the vicinity of the client. The one or more frames may further identify one or more data transfer rate properties for the client, or include any other information or data. The one or more frames may also include identifiers associated with the client, e.g., a specific identifier of the client, or an identifier of a type or class of the client. The one or more frames may further identify data to be transferred or received by the client, e.g., a type or class of the data, or one or more network-enabled applications to be operated by the client, upon associating with one or more access points. In some implementations, the client may transmit a single probe request, or multiple probe requests at any desired interval. Alternatively, in some implementations, a client may transmit the probe request via one channel while the client is already associated with one access point via another channel, e.g., at a designated interval, in order to create or update a list or record of access points and their respective signal strengths based on any probe responses received therefrom. For example, a client may engage in roaming, such as internal roaming, e.g., where the client is associated with a first access point and moves to a second access point, such as where signal strength from the first access point is weak. Alternatively, or additionally, a client may engage in external roaming, such as where a client that is associated with one access point in a first network changes association to another access point in a second network.

At box 330, the access points that receive the probe request determine their respective states with respect to their corresponding sets of rules, e.g., based on the contents of the probe request. For example, where a rules set for a given access point includes rules relating to a number of clients, a maximum data throughput, a type of data or a type of client device, or a history of compliance with rules by the client device or a user thereof, or any other rules that may relate to all access points generally or to the given access point specifically, the given access point may determine a number of clients with which the access point is associated, measure or otherwise determine an amount of throughput (e.g., an instantaneous or average rate), or identify the types of client devices or data being exchanged with such devices, either at present or historically, and compare the number of clients, the throughput, the types of client devices or data to one or more of the rules of the rules set. In some implementations, an access point may be programmed or otherwise configured to identify the client device or a user thereof based on the probe request, and to review or evaluate a history of compliance with one or more of the rules of the discrete set by the client device or the user thereof.

At box 340, each of the access points that is capable of accommodating a connection with the client in accordance with its own discrete rules set returns a probe response to the client. The probe response may also identify one or more supported data transfer rates of which an access point is capable, and include any relevant information including but not limited to an S SID or MAC number associated with the respective access points, or any other information or data.

At box 350, the client transmits an authentication request to one or more of the access points that transmitted probe responses at box 340, in reply to the probe request. Where only a single access point transmits a probe response at box 340, the client transmits the authentication request to that access point, e.g., by initiating a "join phase." Where multiple access points transmit probe responses at box 340, however, then the client may select one or more of the access points, e.g., by an SSID or a MAC number of that access point, on any basis. For example, the client may identify an access point that has a compatible type or method of encryption, or is otherwise capable of associating with the client. The authentication request may include one or more frames that are intended to validate the client, e.g., according to an "open system" authentication algorithm or technique, and may identify a sequence. For example, the one or more frames of the authentication request may include information regarding packets of information included in the frames, e.g., a packet number identifier, a packet length and a time stamp, as well as a data rate, a channel identifier, signal or noise information, a frame duration, a frame destination, a frame source, a BSSID, a sequence number (e.g., a number of frames in an authentication exchange), or a status code, such as an indication that an authentication algorithm or technique is open system.

At box 360, the one or more access points that receive the authentication request return authentication responses to the client. The authentication responses may further include one or more frames that include data corresponding to the authentication request received at box 350, e.g., packet information, data rates, channel identifiers, signal or noise information, frame durations, frame destinations, frame sources, BSSIDs, or status codes. Alternatively, or additionally, where an access point receives frames other than authentication requests or probe requests from one or more unauthorized clients, the access point may return a deauthentication frame intended to place such clients in unauthenticated and unassociated states.

At box 370, the client selects one of the access points that returned the authentication responses at box 360, and transmits an association request to the selected one of the access points. In some implementations, upon receiving the authentication response, the client transitions to an authenticated state, and must begin to transition to an associated state with the selected one of the access points. The association request may contain one or more frames identifying encryption types or other information or data regarding the capabilities of the client to communicate via one or more protocols, standards or specifications. Such encryption types may include, but are not limited to, one or more Wired Equivalent Privacy (WEP) protocols, Wi-Fi Protected Access security protocols (e.g., WPA, WPA2, WPA3), or any other security or encryption protocols.

At box 380, the selected access point transmits an association response to the client, in response to receiving the association request transmitted at box 370. The association response indicates whether the one or more encryption types or other capabilities of the client, as identified in the association request, are consistent with the encryption types or other capabilities of the selected access point. In some implementations, the association response is a confirmation to the client that the client is in an associated state.

At box 390, the client and the access point selected at box 370 begin exchanging data, e.g., with the client in both an authenticated state and an associated state, and the process ends.

As is discussed above, by programming a plurality of access points with discrete sets of rules, loading on a network infrastructure may be balanced. In some implementations, access points may be programmed to decline to provide probe responses, or to otherwise permit client devices to authenticate or associate themselves with client devices seeking access to one or more networks. The rules may be subjectively tailored to a specific access point, or objectively applied to all of the access points collectively, and may be static or dynamic in nature.

Referring to FIGS. 4A through 4D, views of aspects of one system for access point load balancing in accordance with implementations of the present disclosure are shown. Except where otherwise noted, reference numerals preceded by the number "4" in FIGS. 4A through 4D refer to elements that are similar to elements having reference numerals preceded by the number "2" in FIGS. 2A through 2C and by the number "1" shown in FIGS. 1A through 1D.

Figure 4A:
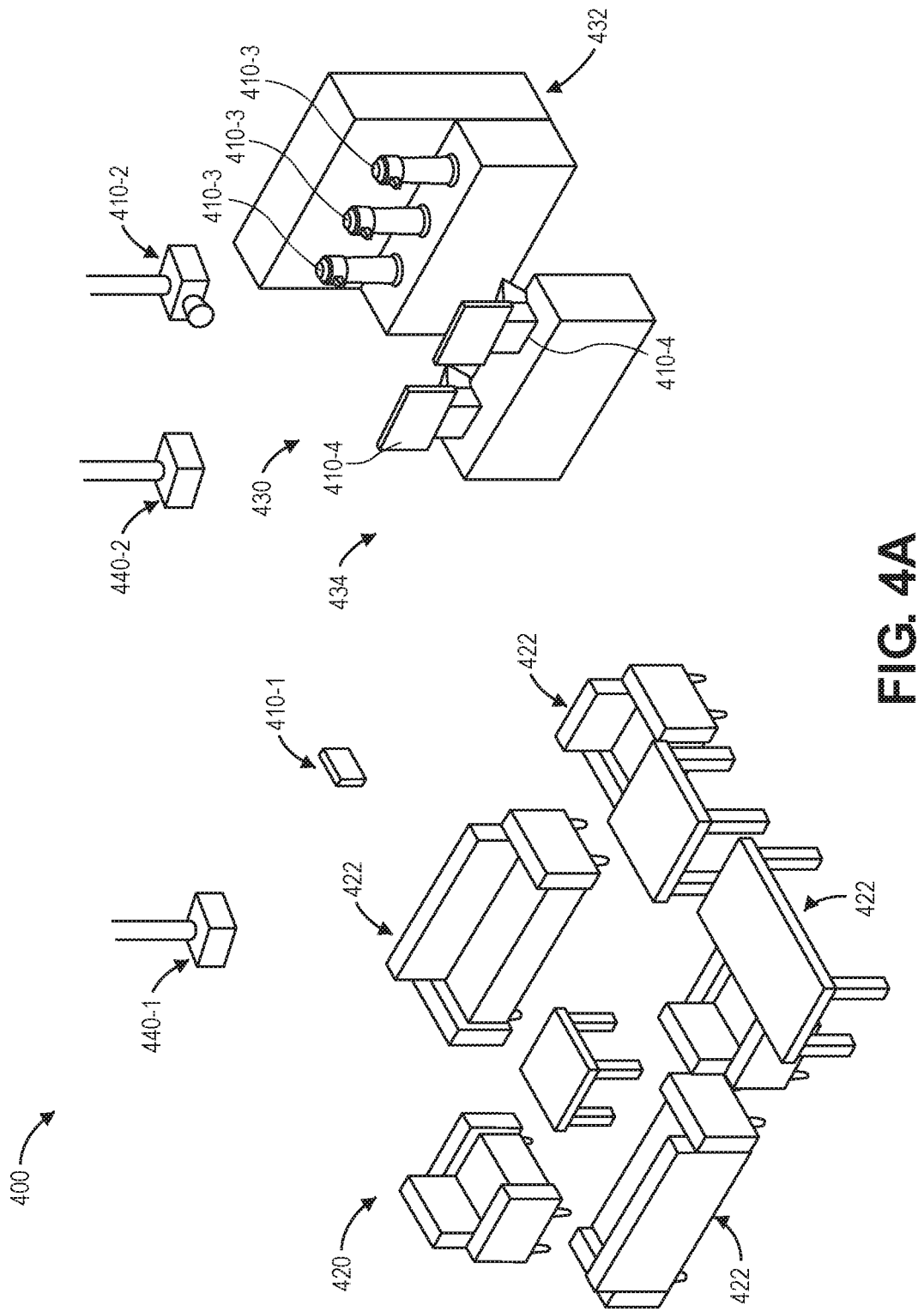
FIGS. 4A through 4D are views of aspects of one system for access point load balancing in accordance with implementations of the present disclosure.

As is shown in FIG. 4A, a system 400 includes a working area or environment (e.g., a coffee shop) having various types of network-enabled client devices 410-1 through 410-4 provided in or around a lounge area 420 and a checkout area 430, and a pair of access points 440-1, 440-2. The lounge area 420 includes a plurality of chairs 422 and associated tables or other features. The checkout area 430 includes a back bar 432 and a cash wrap 434. The access points 440-1, 440-2 may be wireless routers, "hot spots," antenna systems, or any other devices that are configured to enable communication with the Internet or other networks (not shown).

The client devices 410-1 through 410-4 have various shapes or sizes, and are provided or configured to perform one or more functions. For example, a thermostat 410-1 (or other climate control device or sensor) is mounted to a wall or other surface within a vicinity of the lounge area 420 and the checkout area 430. The thermostat 410-1 is configured to sense temperatures in the lounge area 420 and/or the checkout area 430, and to generate one or more control signals over one or more networks to climate control components (not shown), including but not limited to air conditions, heating or ventilation systems. A security camera 410-2 is mounted above the checkout area 430, and aligned to include portions of the checkout area 430 and the lounge area 420 within a field of view. The security camera 410-2 may capture imaging data regarding movements or interactions of actors in the lounge area 420 or the counter area 430, and transmit the imaging data to one or more monitors, stations or data stores (not shown) over one or more networks. A plurality of food monitoring stations 410-3 (e.g., carafes) are provided on the back bar 432 and configured to transmit information or data regarding the conditions of one or more food or beverage products (e.g., coffee) within the stations 410-3 to one or more monitors, stations or data stores (not shown) over one or more networks. A pair of registers 410-4 are provided on the cash wrap 434. The registers 410-4 are provided to enable workers, associates or other actors to execute transactions with customers, e.g., by receiving cash, checks or money orders from such customers, or swiping or otherwise deducting sums of money from a credit card, a debit card or another payment instrument, and authorizing the customers to depart with one or more items. The registers 410-4 are further configured to transmit information or data regarding such transactions to one or more monitors, stations or data stores (not shown), or to other computer devices or systems (e.g., computer systems associated with one or more financial institutions), over one or more networks.

Figure 4B:
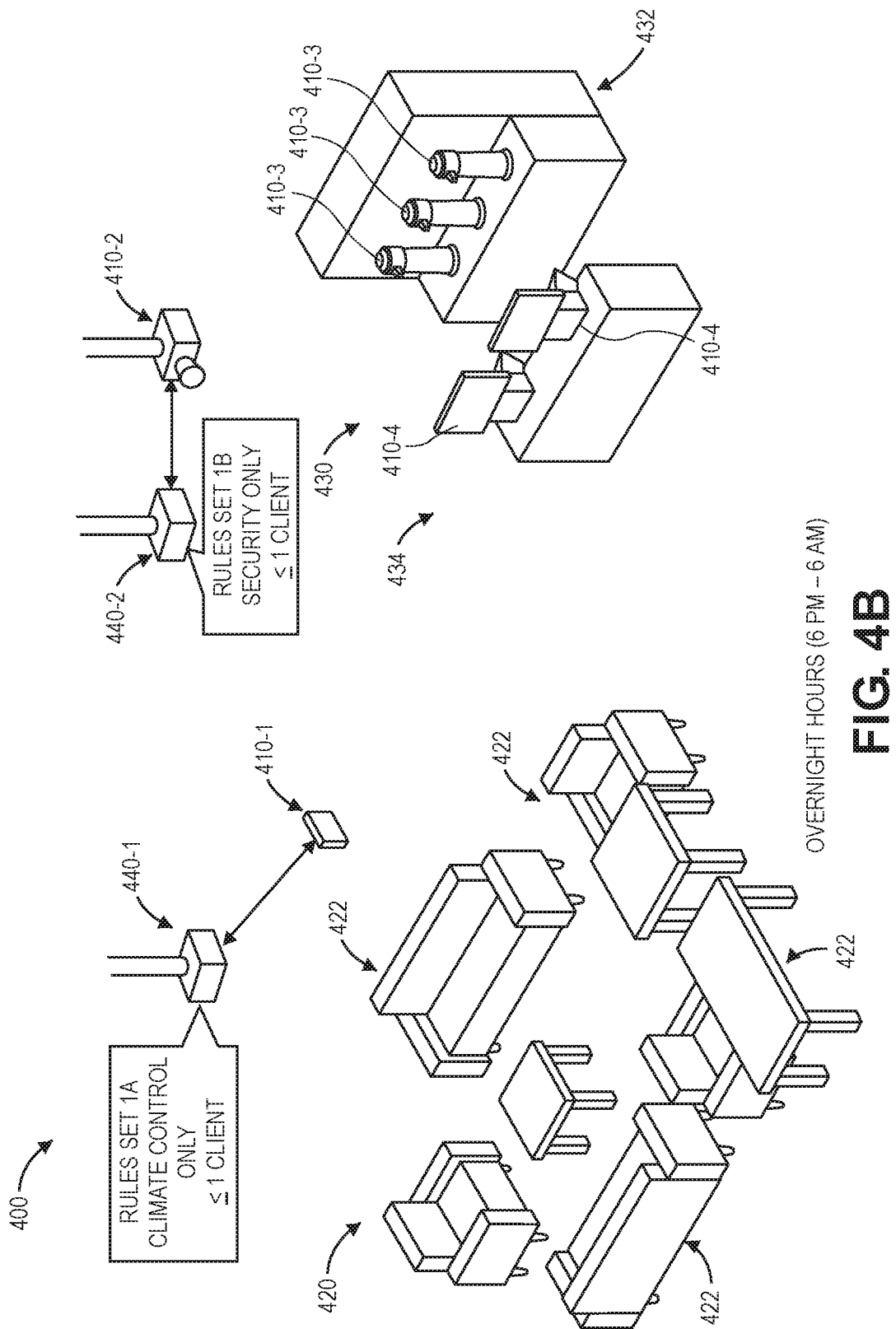

As is discussed above, access points to one or more networks may be programmed with sets of rules that determine whether or when the access points are to respond to probe requests received from client devices. The sets of rules may be established on any basis or consideration, including but not limited to anticipated network traffic, desired levels of security, or any other factors. As is shown in FIG. 4B, during overnight hours (e.g., from six o'clock p.m. to six o'clock a.m.), when the working area or environment associated with the system 400 is closed for operation, the access point 440-1 may be programmed with a rules set (viz., Rules Set 1A) that limits the type of client device to which the access point 440-1 will provide a probe response in reply to a probe request, and a total number of client devices that the access point 440-1 will permit to be associated therewith. For example, as is shown in FIG. 4B, the rules set allows only climate control devices, e.g., the thermostat 410-1, and a maximum of one client to associate with the access point 440-1. For any other type of client devices, or when the access point 440-1 is already associated with one client, the access point 440-1 will not transmit a probe response in reply to any probe request so long as the rules set remains in effect.

Moreover, rules of a set that are defined for programming into an access point may be selected with any policy basis or goal in mind. For example, limits on numbers and types of client devices that may associate with an access point, such as the access point 440-1, may enhance the security of the network to which the access point is connected, as well as the security of any other client devices that may be associated with that network. For example, limiting the number of client devices that may associate with the access point 440-1 during the overnight hours to one prevents any additional client devices (not shown), such as client devices carried or operated by one or more users that are located outside of the working area or environment, but within an operating range of the access point 440-1, from accessing the network via the access point 440-1. Moreover, limiting the type of client devices that may associate with the access point 440-1 during the overnight hours to climate control devices permits the client device 410-1 to associate with the access point 440-1, and to reassociate with the access point 440-1, in the event that a connection with the access point 440-1 is temporarily lost or broken for any reason. For example, if a fraudster, a hacker or another person with surreptitious motives attempts to access a network by way of the access point 440-1 using a client device, that client device may be barred from associating with the access point 440-1 if the client device does not identify itself as (or mimic) a climate control device, e.g., within one or more frames of a probe request or in any other data based on the rules set alone.

Similarly, and as is also shown in FIG. 4B, during the overnight hours, the access point 440-2 may be programmed with a rules set (viz., Rules Set 1B) that limits the type of client device to which the access point 440-2 will provide a probe response in reply to a probe request, and a total number of client devices that the access point 440-2 will permit to be associated therewith. For example, as is shown in FIG. 4B, the rules set allows only security devices, e.g., the security camera 410-2, and a maximum of one client to associate with the access point 440-2. For any other type of client devices, or when the access point 440-2 is already associated with one client, the access point 440-2 will not transmit a probe response in reply to any probe request.

Figure 4C:
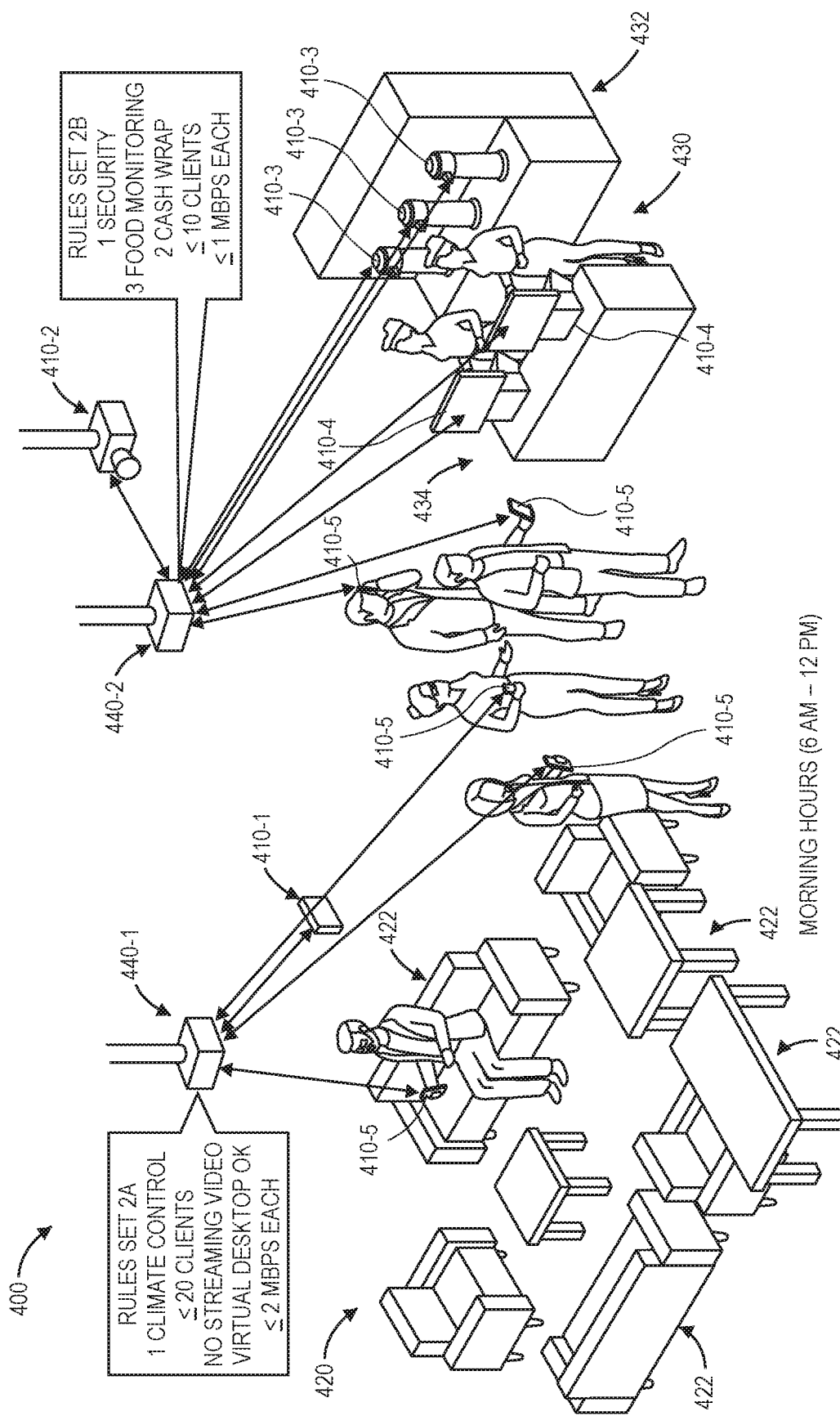

As is shown in FIG. 4C, during morning hours (e.g., from six o'clock a.m. to twelve o'clock p.m.), the access points 440-1, 440-2 may be programmed with different sets of rules to account for the different network demands associated with the expected or anticipated network traffic during such hours. For example, in addition to the thermostat 410-1 and the security camera 410-2, the food monitoring stations 410-3 and the registers 410-4 also require network access during the morning hours. Furthermore, a number of customers bearing mobile devices 410-5 (e.g., laptop computers, tablet computers, smartphones, tablets, wristwatches, or others) entered the working area or environment associated with the system. Such customers may be expected or anticipated to patronize the checkout area 430, such as to order or pick up one or more items, e.g., ordered beverages or snacks, at a high rate during the morning hours. To a lesser extent, some of the customers may frequent the lounge area 420 with their mobile devices 410-5 during the morning hours.

Therefore, as is shown in FIG. 4C, the access point 440-1 may be programmed with a rules set (viz., Rules Set 2A) that limits a total number of climate control devices that may be associated with the access point 440-1 during such hours to one, and a total number of client devices that may be associated with the access point 440-1 to not more than twenty. Likewise, the rules set may also place limits or restrictions on types of data that may be exchanged with the access point 440-1 during such hours. For example, as is shown in FIG. 4C, the rules set may prevent the access point 440-1 from transmitting probe responses in reply to probe requests received from client devices that are engaged in streaming video operations. Alternatively, the rules set may expressly require the access point 440-1 to transmit probe responses in reply to probe requests received from clients that are engaged in virtual desktop operations. Moreover, the rules set may also impose limits on the maximum data throughput, viz., two megabits per second (Mbps), for each of the clients that are associated with the access point 440-1, or, alternatively, a total amount of data throughput through the access point 440-1.

Similarly, as is also shown in FIG. 4C, the access point 440-2 may be programmed with a rules set (viz., Rules Set 2B) that limits a total number of security cameras, food monitoring stations and registers that may associate with the access point 440-2 to one, three and two, each. The rules set may further limit a total number of client devices that may associate with the access point 440-2 to ten, and also impose limits on the maximum data throughput, viz., one megabit per second (Mbps) for each of the clients that are associated with the access point 440-2, or, alternatively, a total amount of data throughput through the access point 440-2.

Limits on numbers or types of client devices, types of data, or data transfer rates that are defined by rules that are programmed into access points may also be used to manage traffic or locations of actors, e.g., customers, who may desire network access via such access points. For example, as is shown in FIG. 4C, the access point 440-2 is programmed with rules that limit the total number of client devices other than the security camera 410-2, the food management stations 410-3 or the registers 410-4 to four, thereby potentially reducing the amount of loitering or standing by customers within a vicinity of the counter area 430, or an amount of time spent by such customers within the vicinity of the counter area 430. Conversely, as is also shown in FIG. 4C, the access point 440-1 is programmed with rules that permit a larger number of client devices other than the thermostat 410-1 (viz., up to nineteen) to associate with the access point 440-1, and further permit such client devices to transfer data at greater rates than client devices that are associated with the access point 440-2. Moreover, the rules further allow workers, students or other customers bearing mobile devices 410-5 to engage in virtual desktop operations when the mobile devices 410-5 are associated with the access point 440-1, but inhibit such customers from watching streaming video. Thus, the rules sets programmed into the access points 440-1, 440-2 during the morning hours encourage customers to briefly patronize the counter area 430, e.g., to quickly order or retrieve ordered cups of coffee from the cash wrap 434, and to spend longer periods of time, e.g., to work or study, in the lounge area 420.

Figure 4D:
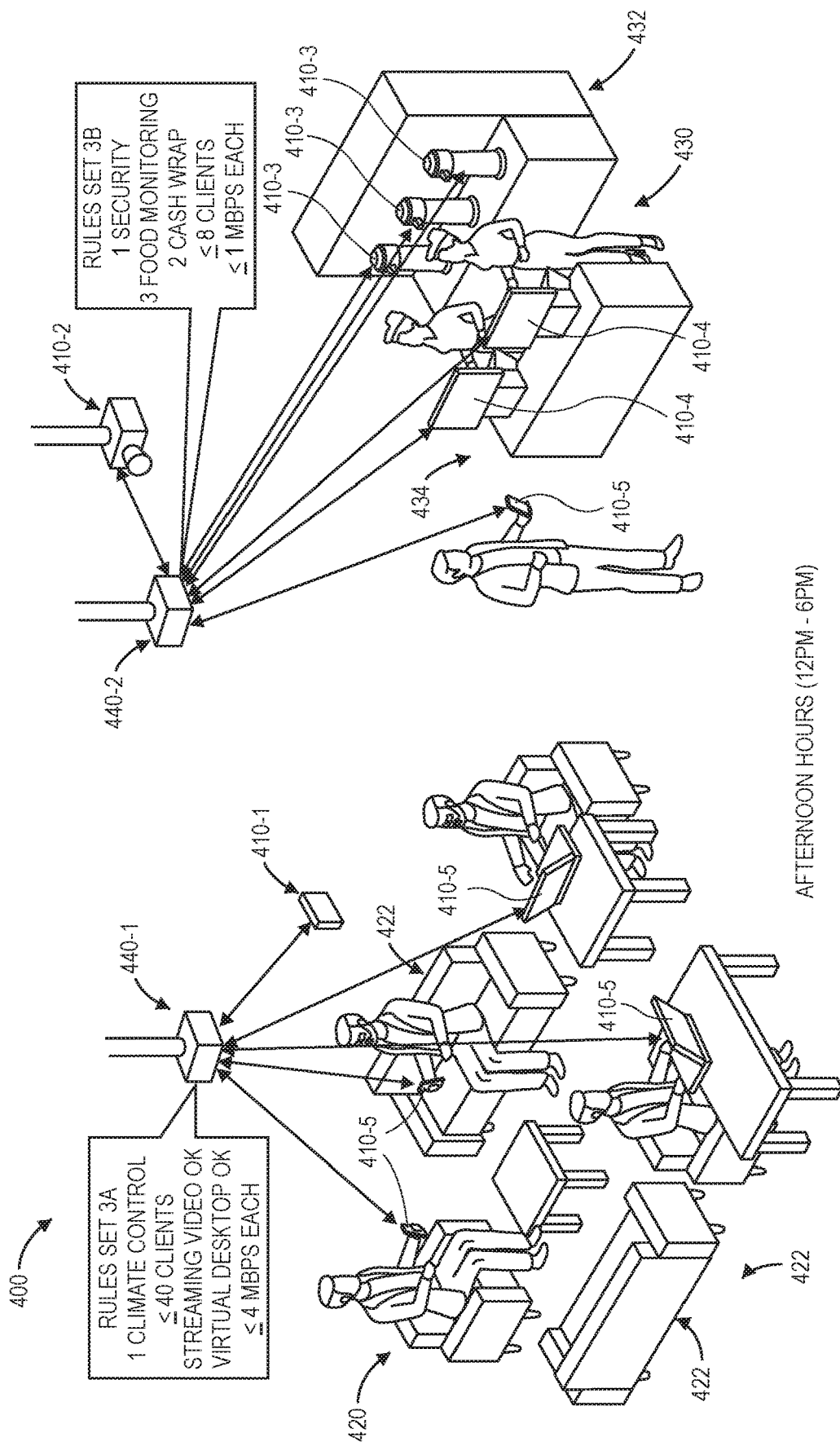

As is shown in FIG. 4D, during afternoon hours (e.g., from twelve o'clock p.m. to six o'clock p.m.), the access points 440-1, 440-2 may be programmed with different sets of rules to account for the different network demands associated with the expected or anticipated network traffic during such hours. For example, as with the morning hours, the thermostat 410-1, the security camera 410-2, the food monitoring stations 410-3 and the registers 410-4 also require network access during the afternoon hours. Additionally, while customers will patronize the checkout area 430 during the afternoon hours, the number of such customers may be expected or anticipated to be lower, and the durations that such customers remain in the working area or environment are expected to be greater, than in the morning hours.

Therefore, as is shown in FIG. 4D, the access point 440-1 may be programmed with a rules set (viz., Rules Set 3A) that limits a total number of climate control devices that may be associated with the access point 440-1 during such hours to one, and a total number of client devices that may be associated with the access point 440-1 to not more than forty. Likewise, the rules set also removes limits or restrictions on streaming video operations, as compared to the rules set that was in effect during the morning hours, and instead expressly requires the access point 440-1 to transmit probe responses in reply to probe requests received from clients that are engaged in both streaming video operations and virtual desktop operations. Moreover, the rules set also raises the limits on the maximum data throughput, viz., four megabits per second (Mbps), for each of the clients that are associated with the access point 440-1, as compared to the rules set that was in effect during the morning hours.

Similarly, as is also shown in FIG. 4D, the access point 440-2 may be programmed with a rules set (viz., Rules Set 3B) that maintains the limits on the total number of security cameras, food monitoring stations and registers that may associate with the access point 440-2 at one, three and two, each. The rules set may further reduce the limit on the total number of client devices that may associate with the access point 440-2 to eight, while maintaining the limits on the maximum data throughput, viz., one megabit per second (Mbps) for each of the clients that are associated with the access point 440-2.

Limits on numbers or types of client devices, types of data, or data transfer rates that are defined by rules that are programmed into access points may also be used to promote activity by actors, e.g., customers, who may desire network access via such access points. For example, as is shown in FIG. 4D, the access point 440-2 is programmed with rules that further limit the total number of client devices other than the security camera 410-2, the food management stations 410-3 or the registers 410-4 to two, thereby potentially reducing a number of customers that require network access via the system that remain within the vicinity of the counter area 430 after ordering and obtaining their food or beverage products. Conversely, as is also shown in FIG. 4D, the access point 440-1 is programmed with rules that increase the number of client devices other than the thermostat 410-1 (viz., up to thirty-nine) to associate with the access point 440-1, and further permit such client devices to transfer data at greater rates than client devices that are associated with the access point 440-2. Such rules encourage customers bearing mobile devices 410-5 to remain in the lounge area 420 for extended periods of time, and to potentially increase an amount of sales of food and beverage products during the afternoon hours.

Sets of rules that are programmed into an access point may remain static, or may change at any time. For example, a network infrastructure having one or more access points may actively monitor network activity on each of such access points, e.g., by one or more components of the network infrastructure, such as a server or other computer device with which each of the access points is connected, or a network interface card (or "NIC"), a hub, a switch, a router, or any other system, including one or more of the access points. One or more rules governing operations of any of the respective access points may be modified, as necessary, in order to maintain the network architecture in an optimal configuration. Changes in rules may be pushed to the access points by one or more infrastructure components, pulled from the infrastructure components by the access points, or otherwise transmitted or programmed into the access points by the infrastructure components in any other manner.

Figure 5:
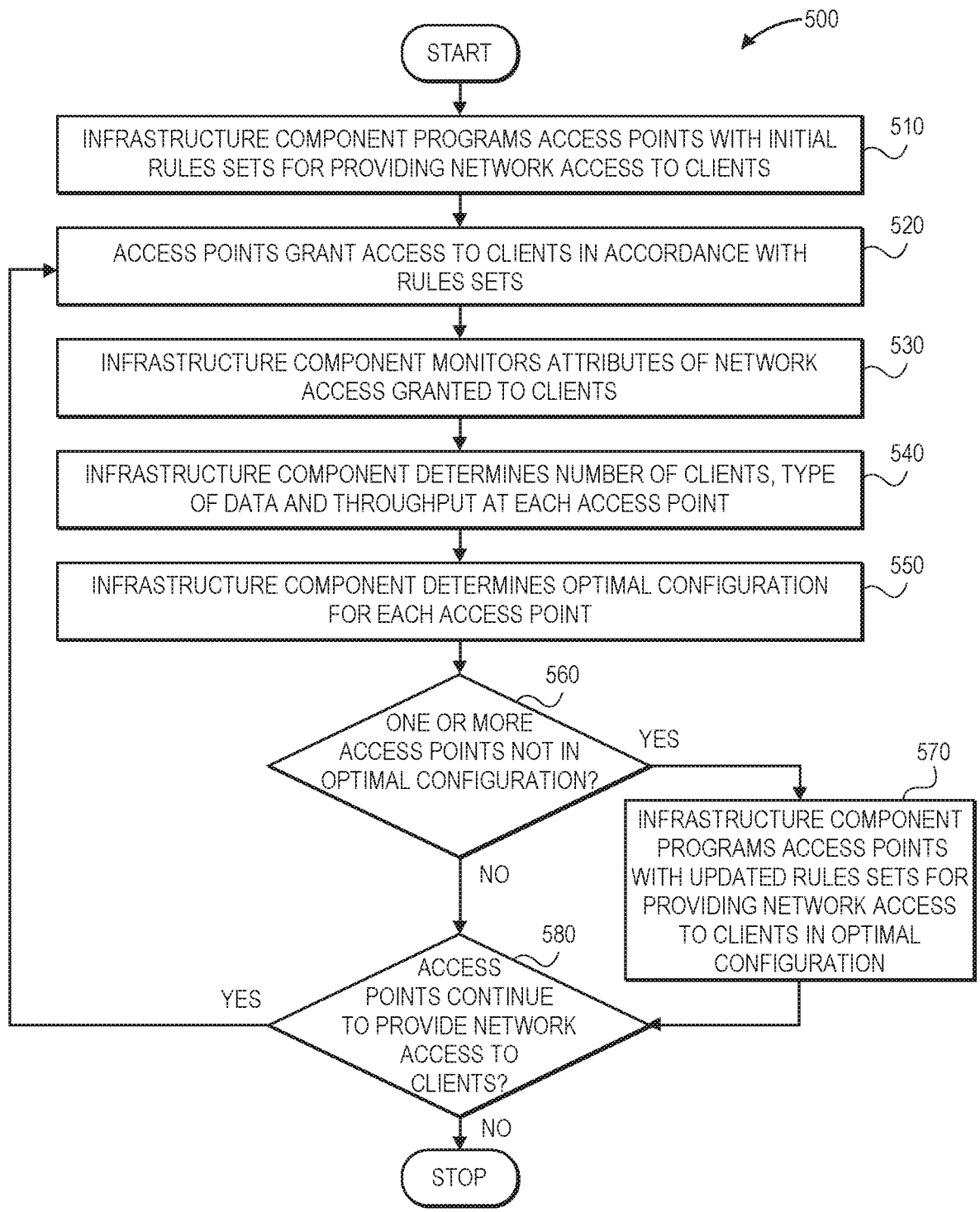
FIG. 5 is a flow chart of one process for access point load balancing in accordance with implementations of the present disclosure.

Referring to FIG. 5, a flow chart 500 of one process for access point load balancing in accordance with implementations of the present disclosure is shown. At box 510, an infrastructure component programs a plurality of access points in a network infrastructure with initial rules sets for providing network access to one or more clients. For example, the infrastructure component may communicate with the access points via wired or wireless means, and according to any protocol, standard or specification. The access points may be provided in association with any working area or environment, e.g., a building, region, structure or other space (covered or uncovered) where access to one or more networks may be desired, such as department stores, financial institutions, grocery stores, homes, materials handling facilities, offices, restaurants, shopping centers, stadiums, transportation centers, or others.

Each of the initial rules sets may include rules that objectively apply to each of the access points or, alternatively, are subjectively tailored to one or more respective access points. For example, the rules may define limits on numbers or types of clients that may associate with a given access point, types of data that may be transferred to or received from such clients, or conditions under which the clients may associate with the given access point. Each of the rules in a rules set may be static or dynamic in nature, or defined as functions of time. The initial rules sets may include any number of rules, including as few as one.

At box 520, the access points grant access to clients in accordance with their initial rules sets. For example, the access points may transmit beacon frames at various intervals, and enable the client devices to passively select one or more of the access points for authentication and association. Alternatively, a client device transmits probe requests identifying the client device's rates of data transfer or network capabilities, and one or more access points may evaluate the probe request according to the one or more rules of their respective rules sets before engaging in authentication and association processes with such client devices.

At box 530, the infrastructure component monitors attributes of the network access that has been granted to the clients. For example, the infrastructure component may receive reports or records synchronously or asynchronously, or in real time or near-real time, from the respective access points, that include such attributes. The attributes may include numbers of clients associated with each of the access points, types of the client devices, types or amounts of data transferred by the client devices, rates of data transferred by the client devices, applications executed by the client devices while associated with a given access point, times at which each of the client devices was associate with a given access point, durations for which each of the client devices has been associated with a given access point, or any other factors. Alternatively, or additionally, the attributes may further include numbers of clients that attempted to associate with a given access point, e.g., by a probe request, to which that the access point did not transmit a probe response. The attributes may also include operational data regarding each of the access points, including but not limited to runtimes, operating temperatures, or other factors.

At box 540, the infrastructure component determines a number of clients, a type of data transferred to or by each of the access points, data throughput of each of the access points, or any other relevant information or data from the attributes determined at box 530. At box 550, the infrastructure component determines an optimal configuration for each of the access points based on the attributes of the network access, the number of clients, the types of data, the data throughput, or any other factors. For example, where each of the initial rules sets is established or defined with respect to known, actual or predicted network demands, the attributes determined at box 530 and the information or data determined at box 540 may be compared to such demands in order to determine whether any of the access points is being overutilized or underutilized, e.g., whether any of the access points has excess capacity, or whether any of the access points is being overly taxed. The optical configurations for each of the access points may be determined individually, or collectively, to ensure that the network architecture is efficiently accommodating the network demands.

At box 560, whether any of the access points is not in the optimal configuration determined for such access points at box 550 is determined. If any of the access points is not in its corresponding optimal configuration, then the process advances to box 570, where the infrastructure component programs the access points that are not in the optimal configuration with updated rules sets for providing network access to clients in the optima configuration. For example, the updated rules sets may impose tighter restrictions on accessibility, or relax restrictions on accessibility, on any basis with regard to the attributes determined at box 530, the information or data determined at box 540, or the optimal configuration determined at box 550.

If all of the access points are in their respective optimal configurations at box 560, or after the infrastructure component has programmed the access points with updated rules sets at box 570, then the process advances to box 580, where whether providing continued network access to the clients via the access points is desired is determined. If continued network access is desired, then the process returns to box 520, where the access points continue to grant access to clients in accordance with their respectively programmed rules sets. If continued network access is no longer desired, however, then the process ends.

Although some implementations of the present disclosure show the use of access points to grant access to one or more client devices in various settings, those of ordinary skill in the pertinent arts will realize that the systems and methods of the present disclosure are not so limited. Rather, the systems and methods of the present disclosure may be utilized in connection with any facility for which the selective control of access to networks is desired.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIG. 3 or 5, orders in which such methods or processes are presented are not intended to be construed as any limitation on the claimed inventions, and any number of the method or process steps or boxes described herein can be combined in any order and/or in parallel to implement the methods or processes described herein. Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A system comprising:
a plurality of access points provided within a vicinity of a working area, wherein the plurality of access points comprises a first access point and a second access point,
wherein each access point in the plurality of access points is in communication with at least one infrastructure component over at least one network,
wherein the first access point comprises:
a first computer processor;
a first memory component having at least a first set of instructions and a first set of rules stored thereon, wherein the first set of rules comprises a first rule regarding a number of client devices that may be associated with the first access point and a second rule regarding a first data transfer rate limit; and
a first transceiver,
wherein the second access point comprises:
a second computer processor;
a second memory component having at least a second set of instructions and a second set of rules stored thereon, wherein the second set of rules comprises a third rule regarding a second number of client devices that may be associated with the second access point and a fourth rule regarding a second data transfer rate limit; and
a second transceiver, and
wherein the first set of instructions, when executed by the first computer processor, cause the first access point to at least:
receive a probe request from a client device; and
in response to receiving the probe request from the client device,
determine a first number of client devices associated with the first access point at a first time;

determine a first data transfer rate of the first access point at the first time;

determine that the first number does not comply with the first rule or that the first data transfer rate does not comply with the second rule; and in response to determining that the first number does not comply with the first rule or that the first data transfer rate does not comply with the second rule, decline to transmit a first probe response to the client device.

2. The system of claim 1, wherein the second set of instructions, when executed by the second computer processor, cause the second access point to at least:

receive the probe request from the client device; and in response to receiving the probe request from the client device, determine a second number of client devices associated with the second access point at a second time, wherein the second time is approximately the first time;

determine a second data transfer rate of the second access point at the second time;

determine that the second number complies with the third rule and that the second data transfer rate complies with the fourth rule; and in response to determining that the second number complies with the third rule and that the second data transfer rate complies with the fourth rule, transmit a second probe response to the client device, wherein the second probe response comprises:

a third data transfer rate of which the second access point is capable; and an identifier of the second access point.

3. The system of claim 1, wherein the working area is one of a retail establishment, an office, a materials handling facility or a transportation center.

4. The system of claim 1, wherein the probe request is transmitted according to an IEEE 802.11 protocol.

5. A method comprising:

programming at least a first access point with a first set of rules, wherein the first access point is in communication with at least one infrastructure component over a network, and wherein the first set of rules comprises:

a rule regarding a maximum number of client devices that may associate with the first access point; and receiving, by the first access point, a request for information regarding a state of at least one access point from a client device at a first time, wherein the request for information comprises:

an identifier of a wireless communications protocol by which the client device is configured to communicate; and a data transfer rate associated with the client device; and in response to receiving the request for information, determining, by the first access point, a first state of the first access point at the first time, wherein the first state is determined with respect to the first set of rules, and wherein the first state of the first access point is that the first access point does not satisfy at least one of the first set of rules; and determining, by the first access point, not to transmit a first response to the request for information based at least in part on the first state.

6. The method of claim 5, further comprising:

programming at least a second access point with a second set of rules, wherein the second access point is in communication with the at least one infrastructure component over the network, and wherein the second set of rules comprises:

a rule regarding a maximum number of client devices that may associate with the second access point;

receiving, by the second access point, the request for information at a second time; and in response to receiving the request for information, determining, by the second access point, a second state of the second access point at the second time, wherein the second state is determined with respect to the second set of rules, and wherein the second state of the second access point is that the second access point satisfies each of the second set of rules; and transmitting, by the second access point, a second response to the request for information based at least in part on the second state, wherein the second response comprises:

a data transfer rate of which the second access point is capable;

an identifier of the second access point; and an identifier of an encryption type of the second access point.

7. The method of claim 6, wherein the request for information is a probe request transmitted according to at least one IEEE 802.11 protocol, and wherein the second response is a probe response transmitted according to the at least one IEEE 802.11 protocol.

8. The method of claim 6, further comprising:

receiving, by the second access point, a request for authentication from the client device, wherein the request for authentication comprises the identifier of the second access point, an identifier of a third time at which the request for authentication was transmitted, a sequence number, a status code and the identifier of the encryption type; and in response to receiving the request for authentication, transmitting, by the second access point, a third response to the request for authentication to the client device, wherein the third response comprises the data rate and the identifier of the client device.

9. The method of claim 8, further comprising:

receiving, by the second access point, a request for association from the client device, wherein the request for authentication comprises the identifier of the second access point and an identifier of an encryption type; and in response to receiving the request for association, transmitting, by the second access point, a fourth response to the request for authentication to the client device, wherein the fourth response comprises an indication that the client device is associated with the second access point.

10. The method of claim 6, wherein the encryption type of the second access point is one of a Wired Equivalent Privacy protocol or a Wi-Fi Protected Access protocol.

11. The method of claim 5, wherein the first set of rules further comprises:

a rule regarding a maximum data transfer rate for client devices associated with the first access point, wherein determining the first state of the first access point at the first time comprises:

determining a data transfer rate of the first access point at the first time; and determining that a sum of the data transfer rate of the first access point at the first time and the data transfer rate associated with the client device exceeds the maximum data transfer rate for client devices associated with the first access point.

12. The method of claim 5, wherein the first set of rules further comprises:
   a rule regarding a type of client device that may associate with the first access point, and
   wherein the request for information further comprises an identifier of a type of the client device.

13. The method of claim 5, wherein the first set of rules further comprises:
   a rule regarding a type of data that may be transmitted or received by client devices associated with the first access point, and
   wherein the request for information further comprises at least one of:
      an identifier of a type of the data to be transmitted or received by the client device; or
      an identifier of a type of the data previously transmitted or received by the client device.

14. The method of claim 6, further comprising:
   transmitting, by the first access point to the at least one infrastructure component, a first report of a first number of client devices associated with the first access point at a third time, wherein the third time follows the second time;
   generating, by the at least one infrastructure component, a third set of rules based at least in part on the first report, wherein at least one rule of the third set of rules is different from at least one rule of the first set of rules; and
   transmitting, by the at least one infrastructure component to the first access point, the third set of rules.

15. The method of claim 6, wherein each of the first access point and the second access point is one of a plurality of access points of a network architecture provided in association with a working area, and
   wherein the at least one infrastructure component comprises at least one of:
      a hub;
      a server;
      a switch;
      a router;
      the first access point;
      the second access point; or
      a third access point, wherein the third access point is one of the plurality of access points.

16. The method of claim 15, wherein the working area is one of:
   a coffee shop;
   a materials handling facility;
   a retail establishment;
   a home;
   a transportation center; or
   a financial institution.

17. A first access point comprising:
   at least a first computer processor;
   at least a first memory component, wherein the first memory component has at least a first set of instructions and a first rules set stored thereon, and wherein the first rules set comprises:
      a first rule defining a maximum number of client devices that may associate with the first access point;
      a second rule defining a maximum data transfer rate for client devices associated with the first access point; and
      a third rule defining a type of data that may not be transmitted to or received from client devices associated with the first access point; and
   at least a first transceiver,
   wherein at least the first set of instructions, when executed by the first computer processor, cause the first access point to at least:
      receive, by the first transceiver over a network, a probe request from a client device over the network, wherein the probe request identifies the client device, a data transfer rate of the client device and at least one protocol by which the client device is configured to communicate wirelessly with one or more access points;
      determine, by at least the first computer processor, that the probe request complies with each of the rules of the first rule set; and
      in response to determining that the probe request complies with each of the rules of the first rule set,
         transmit a probe response to the client device over the network, wherein the probe response comprises:
            a first identifier of the first access point;
            at least a first data transfer rate of the first access point; and
            at least a first encryption type compatible to the first access point.

18. A network architecture comprising the first access point of claim 17, and a second access point, wherein the second access point comprises:
   at least a second computer processor;
   at least a second memory component, wherein the second memory component has at least a second set of instructions and a second rules set stored thereon, and wherein the second rule set comprises:
      a fourth rule defining a maximum number of client devices that may associate with the second access point;
      a fifth rule defining a maximum data transfer rate for client devices associated with the second access point; and
      a sixth rule defining a type of data that may not be transmitted to or received from client devices associated with the second access point;
   at least a second transceiver,
   wherein at least the second set of instructions, when executed by the second computer processor, cause the second access point to at least:
      receive, by the second transceiver over a network, the probe request;
      determine, by at least the second computer processor, that the probe request does not comply with at least one of the rules of the second rule set; and
      in response to determining that the probe request does not comply with at least one of the rules of the second rule set,
         decline to transmit a probe response to the client device over the network.

19. The network architecture of claim 18, wherein each of the first access point and the second access point is provided in association with a working area, and
   wherein the working area is one of:
      a financial institution;
      a home;
      a materials handling facility;
      a retail establishment;
      a stadium; or
      a transportation center.

20. The first access point of claim 17, wherein the probe request and the probe response are transmitted according to at least one IEEE 802.11 protocol.

\* \* \* \* \*